United States Patent

Kurokawa et al.

Patent Number: 5,864,706
Date of Patent: Jan. 26, 1999

[54] DIGITAL SIGNAL PROCESSING APPARATUS AND INFORMATION PROCESSING SYSTEM

[75] Inventors: Masuyoshi Kurokawa; Seiichiro Iwase; Takao Yamazaki, all of Kanagawa; Kenichiro Nakamura, Saitama, all of Japan

[73] Assignee: Sony Corporation, Japan

[21] Appl. No.: 693,005

[22] Filed: Aug. 6, 1996

[30] Foreign Application Priority Data

Aug. 15, 1995 [JP] Japan .................................... 7-230743

[51] Int. Cl.[6] .................................................. G06F 12/00

[52] U.S. Cl. .............................. 395/800.35; 395/800.36; 395/800.28; 395/800.01

[58] Field of Search ........................ 395/800.01, 800.35, 395/800.28, 800.19, 800.14, 800.36, 800.23

[56] References Cited

U.S. PATENT DOCUMENTS

| | | | |
|---|---|---|---|
| 4,783,732 | 11/1988 | Morton | 365/230.05 |
| 5,155,852 | 10/1992 | Murakami et al. | 395/670 |
| 5,590,349 | 12/1996 | Robinson et al. | 395/800.36 |
| 5,689,450 | 11/1997 | Kurokawa et al. | 364/736 |

OTHER PUBLICATIONS

"SVP: Serial Video Processor", Childers, Jim, et al., IEEE 1990 Custom Integrated Circuits Conference, p. 17.3.1.
"Serial Video Processor Seminary Handbook", Texas Instruments, 1991.

Primary Examiner—Eric Coleman
Assistant Examiner—Mackly Monestime
Attorney, Agent, or Firm—Ronald P. Kananen

[57] ABSTRACT

A digital signal processing apparatus and information processing system provide sufficient arithmetic operation performance to process high rate signals in real time and high programming performance to deal with various applications. A group of processor elements is constituted by individual processor elements each formed by disposing an arithmetic and logic unit on the bit lines of a multiport memory wherein their number is equal to or larger than the number of the data bits in a series of serial data, and the plurality of processor elements constituting the group of processor elements are uniformly controlled by controllers mounted on the same silicon chip. Consequently, the multiport memory functioning as a buffer for input data and the arithmetic and logic unit are closely joined together, so data can be communicated smoothly between them. Since the plurality of processor elements are controlled by a single controller so as to operate as a parallel computer, a digital signal processor with a high processing speed can be implemented.

57 Claims, 32 Drawing Sheets

| MNEMONIC | sqc | ext | FUNCTION |
|---|---|---|---|
| CONT | 0 | — | TO NEXT ADDRESS |
| JUMP | 1 | jumpaddress | TO SPECIFIED JUMP ADDRESS |
| JPCC | 2 | — | TO JUMP ADDRESS SPECIFIED BY CC |
| RTN | 3 | — | RETURN |
| JSUB | 4 | jumpaddress | JUMP SUBROUTINE |
| RPT | 5 | repeatcount | REPEAT SAME SENTENCE PREDETERMINED NUMBER OF TIMES AND GO TO NEXT ADDRESS. |
| RPTR | 6 | repeatcount | REPEAT SAME SENTENCE PREDETERMINED NUMBER OF TIMES AND RETURN. |
| WAIT | 7 | waitsel | WAIT FOR SIGNAL SPECIFIED BY ext FIELD UNTIL DESIRED CONDITION IS MET. |

FIG. 14

| cc1,cc0 | FUNCTION |
|---|---|
| 0 | NOT USE COEFFICIENT RAM. |
| 1 | USE TWO BITS FOR BOOTH DECODER. |
| 2 | USE LSB OF COEFFICIENT BITS FOR INPUT TO ALU A. |
| 3 | USE MSB OF COEFFICIENT BITS FOR INPUT TO ALU A. |

FIG. 16

| ce1,ce0 | FUNCTION |
|---|---|
| 0 | LOAD & HOLD |
| 1 | LOAD & INCREMENT |
| 2 | HOLD |
| 3 | INCREMENT |

FIG. 17

① WHEN coefadd < stadd or coefadd > endadd
   add = coefadd
② WHEN stadd ≦ coefadd ≦ endadd and (coefadd + step) ≦ endadd
   add = coefadd + step
③ WHEN stadd ≦ coefadd ≦ endadd and (coefadd + step) > endadd
   add = coefadd + step − (endadd − stadd)

WHEREIN:
"stadd" IS START ADDRESS OF SPECIFIC REGION,
"endadd" IS END ADDRESS OF SPECIFIC REGION,
"step" IS STEP VALUE,
"coefadd" IS coefadd FIELD OF CODE RAM, AND
"add" IS ADDRESS COUNTER.

FIG. 18

|  | MSB　　　　　　LSB<br>8 7 6 5 4 3 2 1 0 |
|---|---|
| IR1 MODE<br>IR1 ADDRESS | 1 1 0 0 x x x x x<br>1 0 0 0 ? ? ? ? ? |
| IR2 MODE<br>IR2 ADDRESS | 1 1 0 1 x x x x x<br>1 0 0 1 ? ? ? ? ? |
| OR MODE<br>OR ADDRESS | 1 1 1 0 x x x x x<br>1 0 1 0 ? ? ? ? ? |
| RF | 0 ? ? ? ? ? ? ? ? |
| nop | 1 1 1 1 x x x x x |

"x" IS DON'T CARE, AND
"?" IS ARBITRARY
   ADDRESS VALUE.

FIG. 19

| r1c3, r2c3, wc3 | FUNCTION |
|---|---|
| 0 | ADDRESS REGISTER (reg2) HOLD |
| 1 | ADDRESS REGISTER (reg2) INCREMENT |
| reg2ctl | FUNCTION |
| 0 | ADDRESS REGISTER (reg2) HOLD |
| 1 | ADDRESS REGISTER (reg2) LOAD<br>(rp1 rp2 w r1 COMMON) |

FIG. 20

| r1c2-0, r2c2-0, wc2-0 | FUNCTION |
|---|---|
| 0 | LOAD & HOLD |
| 1 | LOAD & INCREMENT |
| 2 | ADDRESS REGISTER & HOLD |
| 3 | ADDRESS REGISTER & INCREMENT |
| 4 | HOLD |
| 5 | INCREMENT |
| 6 | INCREMENT & HOLD |
| 7 | INCREMENT |

FIG. 21

① WHEN countadd < stadd or countadd > endadd
    add = countadd
② WHEN stadd ≦ countadd ≦ endadd and (countadd + step) ≦ endadd
    add = countadd + step
③ WHEN stadd ≦ countadd ≦ endadd and (countadd + step) > endadd
    add = countadd + step - (endadd - stadd)

WHEREIN:
"stadd" IS START ADDRESS OF SPECIFIC REGION,
"endadd" IS END ADDRESS OF SPECIFIC REGION,
"step" IS STEP VALUE,
"countadd" IS ADDRESS COUNTER VALUE, AND
"add" IS ADDRESS COUNTER.

FIG. 22

| Y2i | Y2i+1 | Y2i+2 | (Y2i+2 + Y2i+1 - 2*Y2i) |
|---|---|---|---|
| 0 | 0 | 0 | 0 |
| 0 | 0 | 1 | 1 |
| 0 | 1 | 0 | 1 |
| 0 | 1 | 1 | 2 |
| 1 | 0 | 0 | -2 |
| 1 | 0 | 1 | -1 |
| 1 | 1 | 0 | -1 |
| 1 | 1 | 1 | 0 |

| | |
|---|---|
| INITIALIZATION | PROCESSING REQUIRED BEFOREHAND SUCH AS NUMBERING OF "PEs" AND LOADING OF COEFFICIENTS. |
| SELECTION OF PROGRAM | USE CONTROL CODES TO SELECT ONE OF PROGRAMS WRITTEN TO SEVERAL CODE RAMs WHICH EXECUTES REQUIRED PROCESSING AND JUMP TO THAT ADDRESS. |
| PROCESSING | EXECUTE SELECTED PROCESSING AND REPEAT IT OR RETURN TO PROGRAM SELECTION. |

FIG. 34

| | |
|---|---|
| READS | SPECIFIC TO 1ST PROCESSOR ELEMENTS. IN RESPONSE TO WAIT INSTRUCTION, PROCESS WAITS FOR SYNC SIGNAL OF "L" FOR INPUTS, AND ONCE THIS CONDITIONS HAS BEEN MET, READS DATA FROM "IRs". |
| WRITES | SPECIFIC TO 2ND PROCESSOR ELEMENTS. IN RESPONSE TO WAIT INSTRUCTION, PROCESS WAITS FOR SYNC SIGNAL OF "L" FOR OUTPUTS, AND ONCE THIS CONDITIONS HAS BEEN MET, WRITES DATA FROM "OR". |
| TRANSFER | 1ST AND 2ND PROCESSOR ELEMENTS SYNCHRONIZE WITH EACH OTHER BY WAITING FOR transopen SIGNAL. IF CONTROLLERS FOR BOTH PROCESSING ELEMENTS CAN SYNCHRONIZE WITH EACH OTHER, transopen SIGNAL IS ENABLED, 1ST PROCESSOR ELEMENT PERFORMS WRITE OPERATION, AND 2ND PROCESSOR ELEMENT GENERATES ADDRESSES THAT CAN ACCOMMODATE IMAGE DATA OUTPUT BY 1ST PROCESSOR ELEMENT, THEREBY INITIATING DATA TRANSFER. |
| PROCESSING | PROCESS CARRIES OUT REQUIRED PROCESSING BY EXECUTING LOGICAL OR ARITHMETIC OPERATIONS DESCRIBED ABOVE. |

FIG. 35

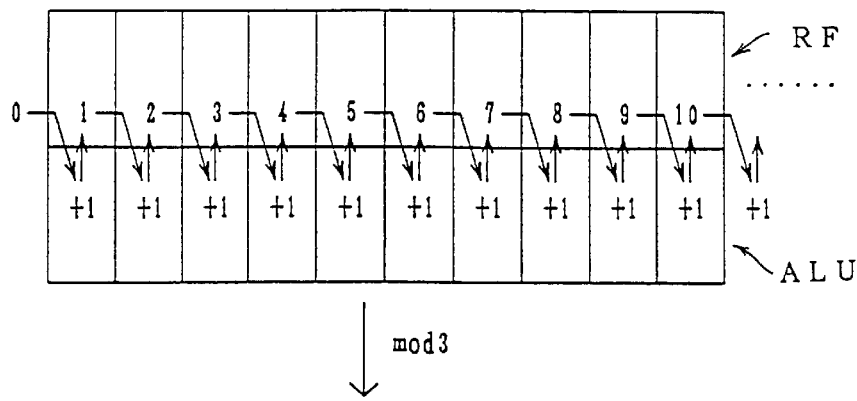

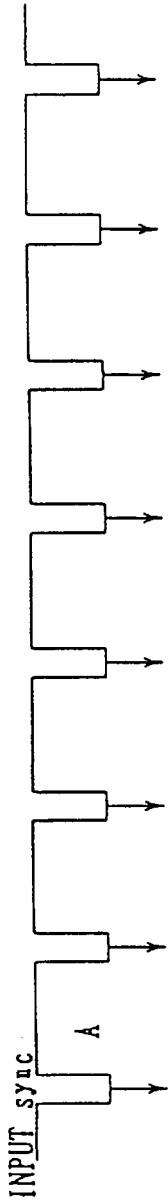
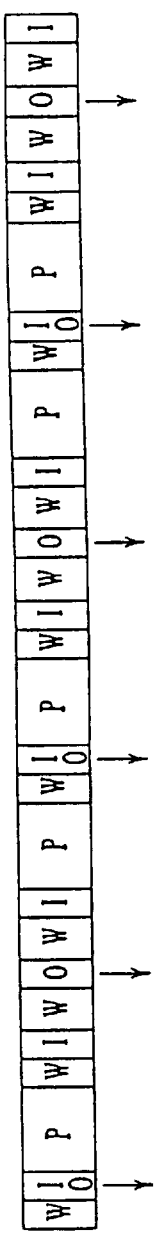
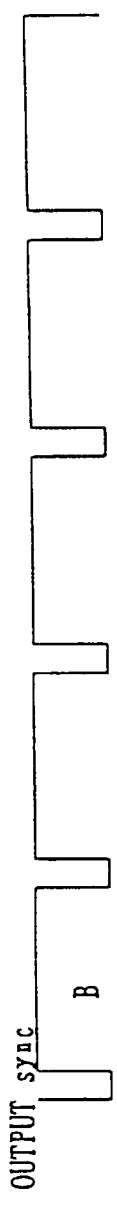
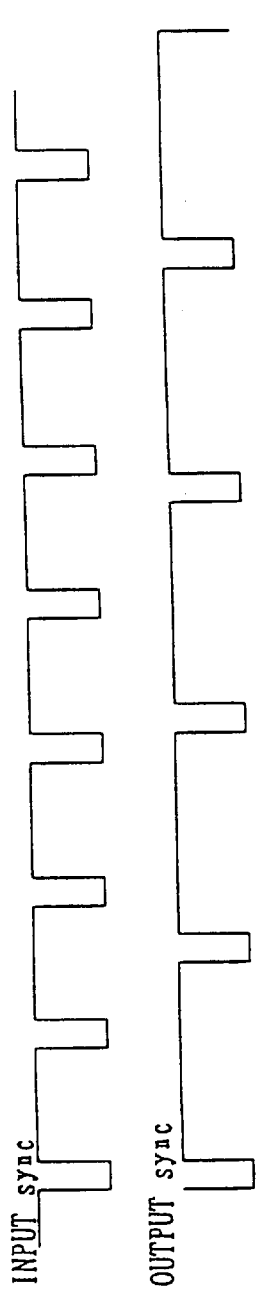
FIG. 38A
FIG. 38B
FIG. 38C
FIG. 41A
FIG. 41B

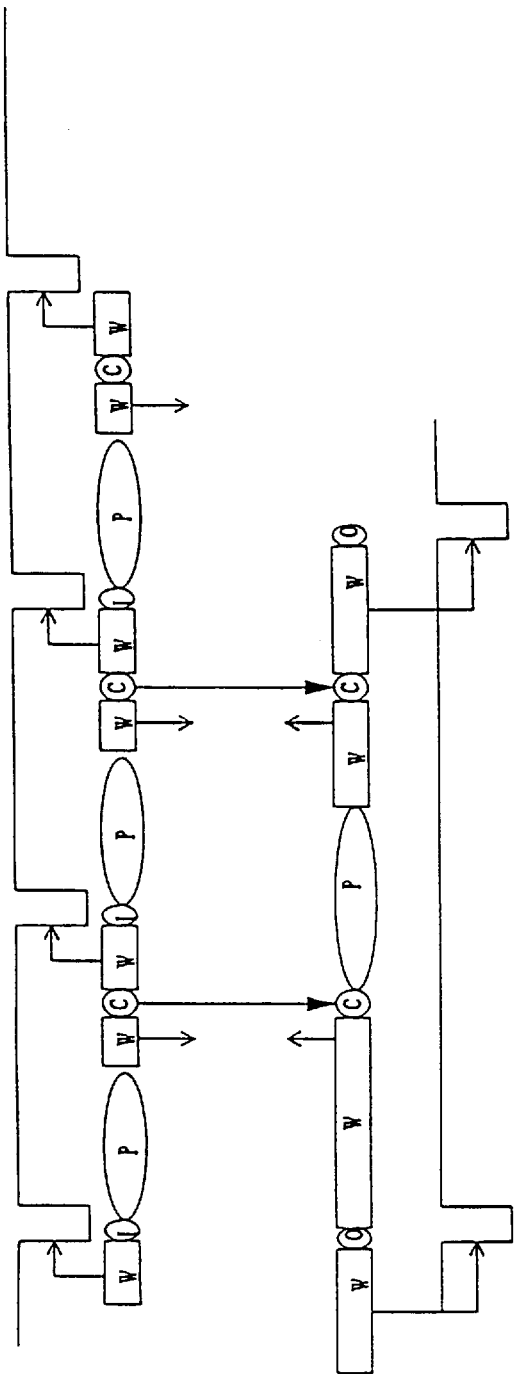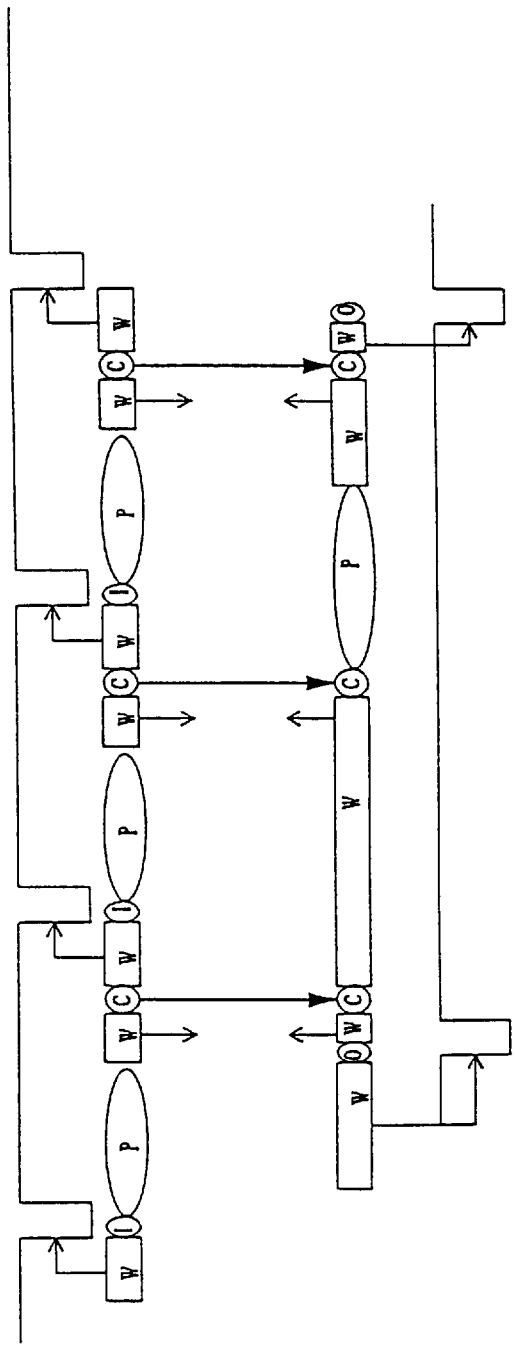
FIG. 42A  FIG. 42B  FIG. 42C  FIG. 42D

DIGITAL SIGNAL PROCESSING APPARATUS AND INFORMATION PROCESSING SYSTEM

BACKGROUND OF THE INVENTION

1. Field of the Invention

The present invention relates to a digital signal processing apparatus, and more particularly, is applicable to an array processor for concurrently and digitally process image signals in real time.

2. Description of the Related Art

Serial video processors (SVP) have been known as array processors of the above kind (see "SVP: Serial Video Processor", IEEE 1990 CUSTOM INTEGRATED CIRCUITS CONFERENCE, p17.3.1). References on such processors include "Serial Video Processor Seminar Handbook" from Texas instruments Co. Ltd.

This processor comprises a one-dimensional array of 1,024 one-bit processor elements which constitute a single instruction multiple data (SIMD) architecture. The SIMD method allows a plurality of arithmetic and logic units and data to execute the same operation according to an instruction in the same flow.

In recent years, due to demand for the processing of high-speed and high-rate signals such as images in real time, these processors are required to have functions that provide both sufficiently high arithmetic performance and programmability that enables various applications to be processed. The reduction of power consumption and costs is also required.

Recent processors are also required to process high definition HD signals in addition to standard image signals such as NTSC signals.

Conventional methods that match the architecture with each image signal method, however, cannot avoid the provision of useless processors that do not operate when different image signals are provided on a image line. Thus, it is necessary to provide processors that can process different image signals based on different methods and also provide sufficient processing performance.

In addition, as multimedia applications gain more and more popularity, signal processing for images becomes more and more complicated, resulting in demand for high signal processing performance. Processors for such applications, however, are likely to be large and complicated, so it is necessary to provide a configuration that constitutes a simple control circuit with a small area but which provides sufficient programmability to implement not only various calculations but also high-level applications such as rate converters.

SUMMARY OF THE INVENTION

In view of the foregoing, an object of this invention is to provide a digital signal processing apparatus that has high programmability for high rate signals including images and which can realize high arithmetic performance and low power consumption.

The foregoing object and other objects of the invention have been achieved by the provision of a digital signal processing apparatus which constitutes a group of processor elements each comprising an arithmetic and logic unit located on a bit line of a multiport memory in which the number of processor elements is equal to or larger than that of a series of serial data bits.

The plurality of processor elements constituting the group of processor elements are uniformly controlled by a controller mounted on the same silicon chip on which the processor elements are mounted.

Since the multiport memory functioning as an input data buffer and the arithmetic and logic unit are closely joined together, data can be communicated smoothly between them. In addition, a digital signal processing apparatus with a high processing speed can be implemented because the plurality of processor elements are controlled by a single controller so as to operate as a parallel computer.

The nature, principle and utility of the invention will become more apparent from the following detailed description when read in conjunction with the accompanying drawings in which like parts are designated by like reference numerals or characters.

DESCRIPTION OF THE DRAWINGS

In the accompanying drawings:

FIG. 14 is a table showing the contents of sequence control;

FIG. 16 is a table showing the contents of control by "coefcc";

FIG. 17 is a table showing the contents of control by a coefficient RAM circuit;

FIG. 18 is a table showing conditions under which different coefficients are cyclically used while the same program is generating the same "coefadd";

FIG. 19 is a table showing an address map;

FIG. 20 is a table showing the contents of control for an address register;

FIG. 21 is a table showing the contents of control for an address register;

FIG. 22 is a table showing conditions under which different areas are cyclically used while the same program is used to cause the same memory region to be accessed;

FIG. 25 is a table showing the relationship between the value of partial products and coefficients;

FIGS. 26 and 27 are schematic diagrams showing examples of calculation;

FIG. 34 is a table showing a general programming method for the DSP;

FIG. 35 is a table showing the contents of processing;

FIGS. 36A to 36C and 37 are schematic diagrams showing a procedure for tripling the size of a scan image.

FIGS. 38A to 38C are schematic diagrams showing a rate conversion in the vertical direction;

FIGS. 41A and 41B and 42A to 42D are schematic diagrams explaining a general rate conversion.

DETAILED DESCRIPTION OF THE EMBODIMENT

Preferred embodiments of this invention will be described with reference to the accompanying drawings:

(1) Basic Configuration (1-1) General Configuration

Figure 1:
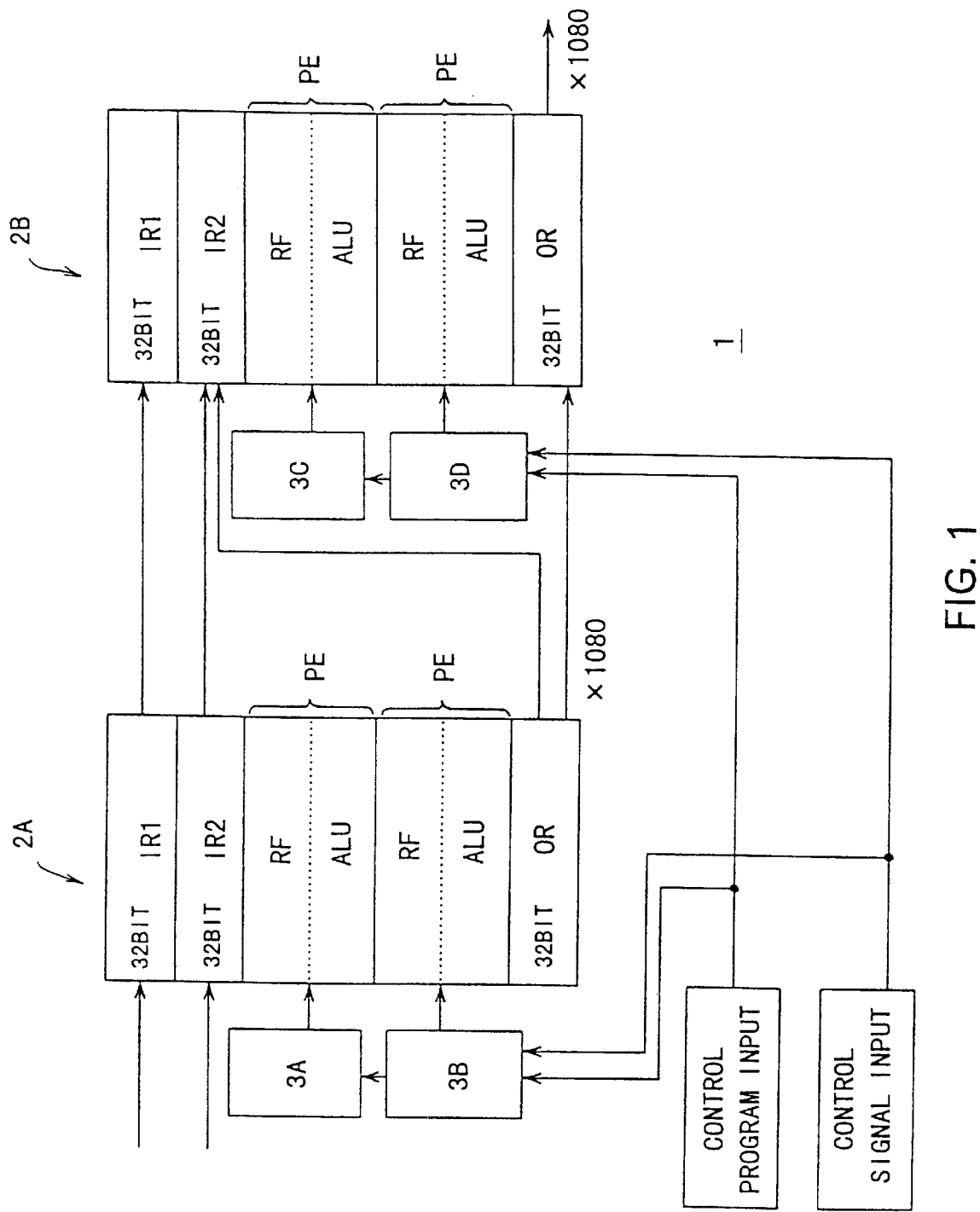
FIG. 1 is a block diagram showing an example of the general configuration of a digital signal processing apparatus according to this invention.

FIG. 1 shows one example of a digital signal processor according to this invention. As shown in FIG. 1, a digital signal processor 1 chip roughly comprises two processor blocks 2A and 2B and four controllers 3A to 3D.

The controllers 3A to 3D independently control the processor elements PE in the processor blocks 2A and 2B. The controllers 3A to 3D are control circuits including memories for controlling the processor blocks based on externally received programs, data from various registers, or control signals such as timing signals.

Methods of connecting the blocks together are described below.

Each of the processor blocks 2A and 2B comprises two vertically disposed groups of 1,080 horizontally disposed processor elements PE each comprising a memory (hereafter referred to as an "RF register file") and an arithmetic and logic unit (hereafter referred to as an "ALU"); and input registers IR and an output register OR that are serial access memories for inputs and outputs (I/Os), in which all these components are provided on a silicon chip.

The ALU comprises a one-bit full adder, a selector for selecting data, a register for pipeline operations, a register for delaying data to a subsequent instruction step, and a register for setting the operation mode.

According to this embodiment, input registers IR1 and IR2 are mounted as registers for inputting signals in such a way that they can operate independently.

Data is word-serially input to the input registers IRs, and word-serially processed data is output from the output register OR. The input registers IRs and the output register OR each comprise an element consisting of memory cells corresponding to respective processor elements.

(1-2) Configuration of the Processor Block (1-2-1) Configuration of the Input Register (IR)

Figure 2:
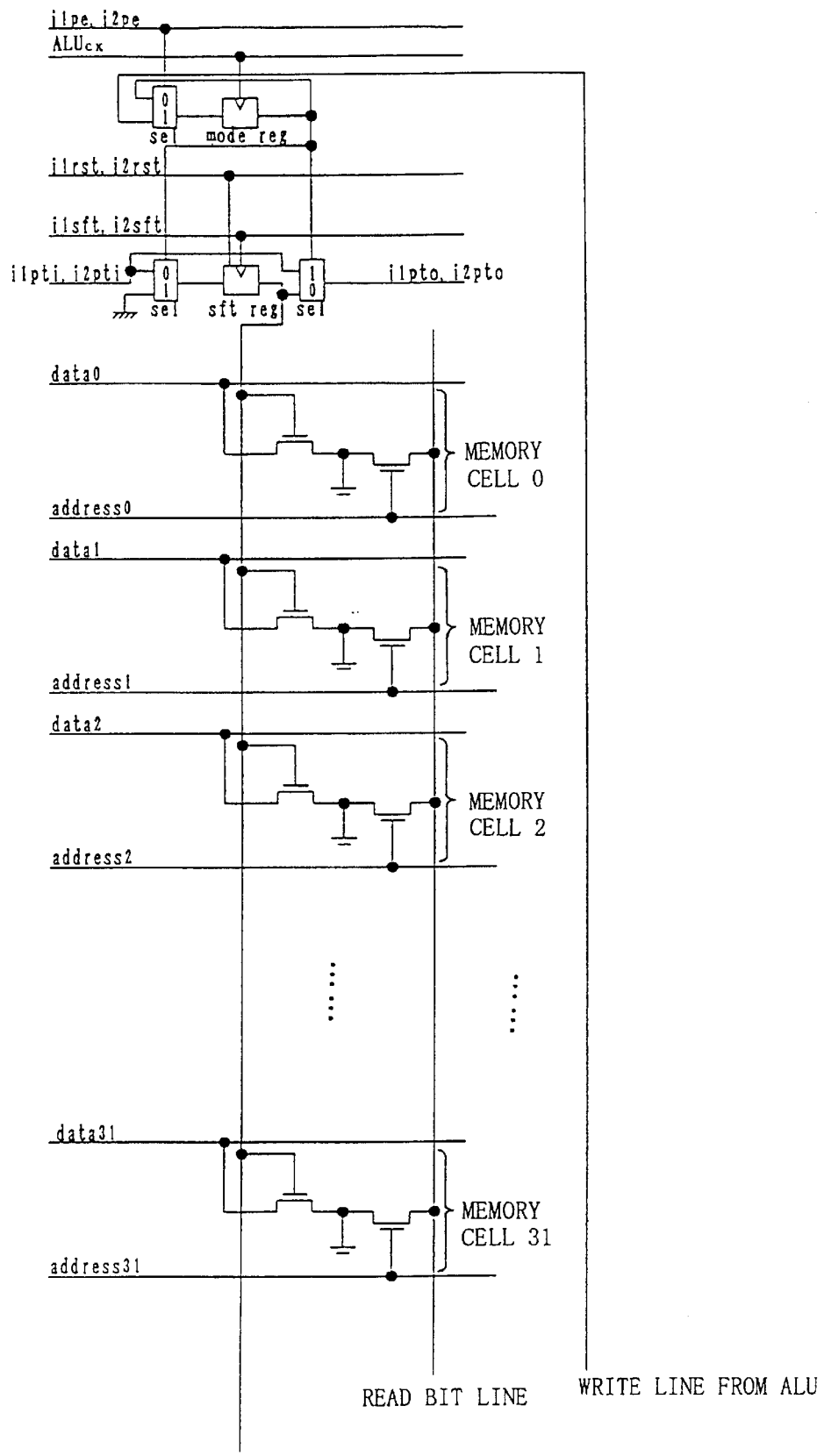
FIG. 2 is a connection diagram showing an example of the configuration of the elements of an input register.

FIG. 2 shows one example of the configuration of the input register IR element. In this example, for a single processor element PE, the two input registers IR1 and IR2 each comprise 32 bits of memory cells, a one-bit shift register (sft reg) and a register for setting the operation mode (mode reg). FIG. 2 shows only one of two input registers.

This memory drives, to bit lines described as "data0 to data31", 32 bit data input from an external input port in order to write the 32 bits to the memory cells at a time.

This write operation is performed when the shift register has a value of "1", and not when it has a value of "0".

The shift register placed in each element is connected to the shift register located in an adjacent element via a selector.

When the input of data is started, "1" is simultaneously input to the input registers IRs from one end of the block, and sequentially transferred toward the other end of the block. Data driven at this point of time in elements with "1" present therein is written to these elements.

The processor element PE can write "0" or "1" to the mode register (mode reg) for selecting the operation mode. The value of this register controls the selectors respectively placed before and after the shift register.

If this value is "0", the write operation is performed.

On the other hand, if the value is "1", the selectors respectively placed before and after the shift register are switched. When "1" is transmitted to the shift register for an element, the selectors set their shift register to "0" and pass the transmitted "1" to subsequent shift registers.

In this case, the data is not written to the relevant memory cells. The data is sequentially written to elements other than those elements in which the mode register (mode reg) has been set to "0".

Data is read from these memory cells by specifying an address to drive any of "address0 to address31" in order to load the data in the read bit line.

In FIG. 2, the memory cell is described as a capacitor or a dynamic RAM, but is not limited to this type.

(1-2-2) Configuration of the Output Register (OR)

Figure 3:
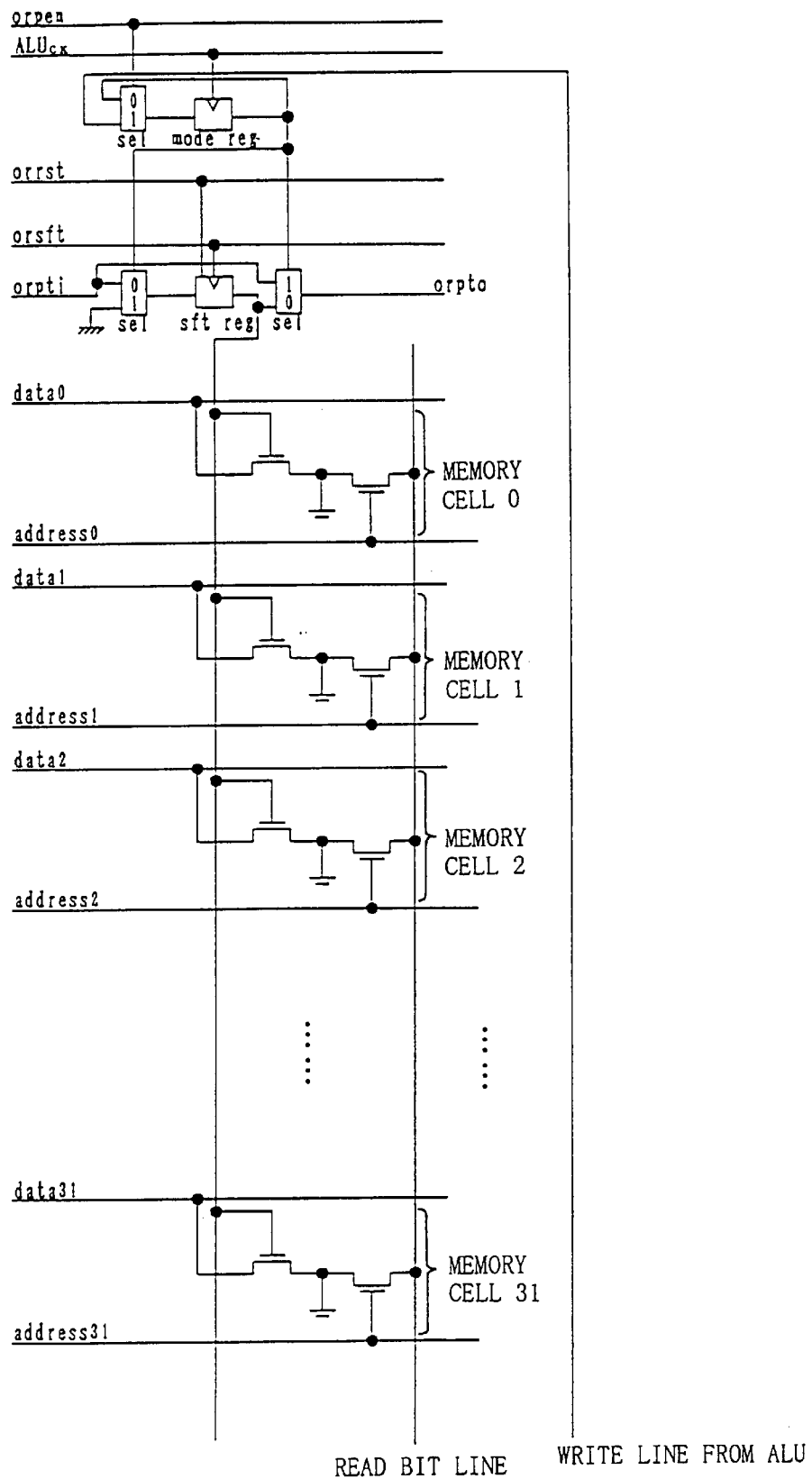
FIG. 3 is a connection diagram showing an example of the configuration of the elements of an output register.

FIG. 3 shows one example of the configuration of the output register OR element. In this example, for a single processor element, the output register comprises 32 bits of memory, a one-bit shift register (sft reg), and the register for setting the operation mode (mde reg). In the output register OR, data can also be written bites to each memory cell from the write bit line by specifying any of address0 to address31.

Thirty-two-bit data can be simultaneously read in parallel from the memory to an external output port via the bit lines described as data0 to data31. This read operation is performed when the shift register has a value of "1", and not when it has a value of "0".

The shift register for each element is connected to the shift register for an adjacent element via a selector.

When the output of data is started, "1" is input to the output register OR from one end of the block, and sequentially transferred toward the other end of the processor block. In this case, data is sequentially read from the memory cells for elements with "1" present in their shift registers.

The processor element PE can write "0" or "1" to the mode register (mode reg) for selecting the operation mode. The value of this register controls the selectors respectively placed before and after the shift register.

If this value is "0", the write operation is performed as described above. On the other hand, if the value is "1", the selectors respectively placed before and after the shift register are switched. When "1" is transmitted to the shift register for an element, the selectors set their shift register to "0" and pass the transmitted "1" to the following shift register. In this case, data is not read from the memory cells for this element.

The value of "1" is passed to the shift registers for subsequent elements with the same timing. Data is read from elements other than this element.

The memory cell is described as a capacitor or a dynamic RAM, but is not limited to this type. A sense amplifier can be provided as required.

(1-2-3) Configuration of the Memory (the RF Register File)

Figure 4:
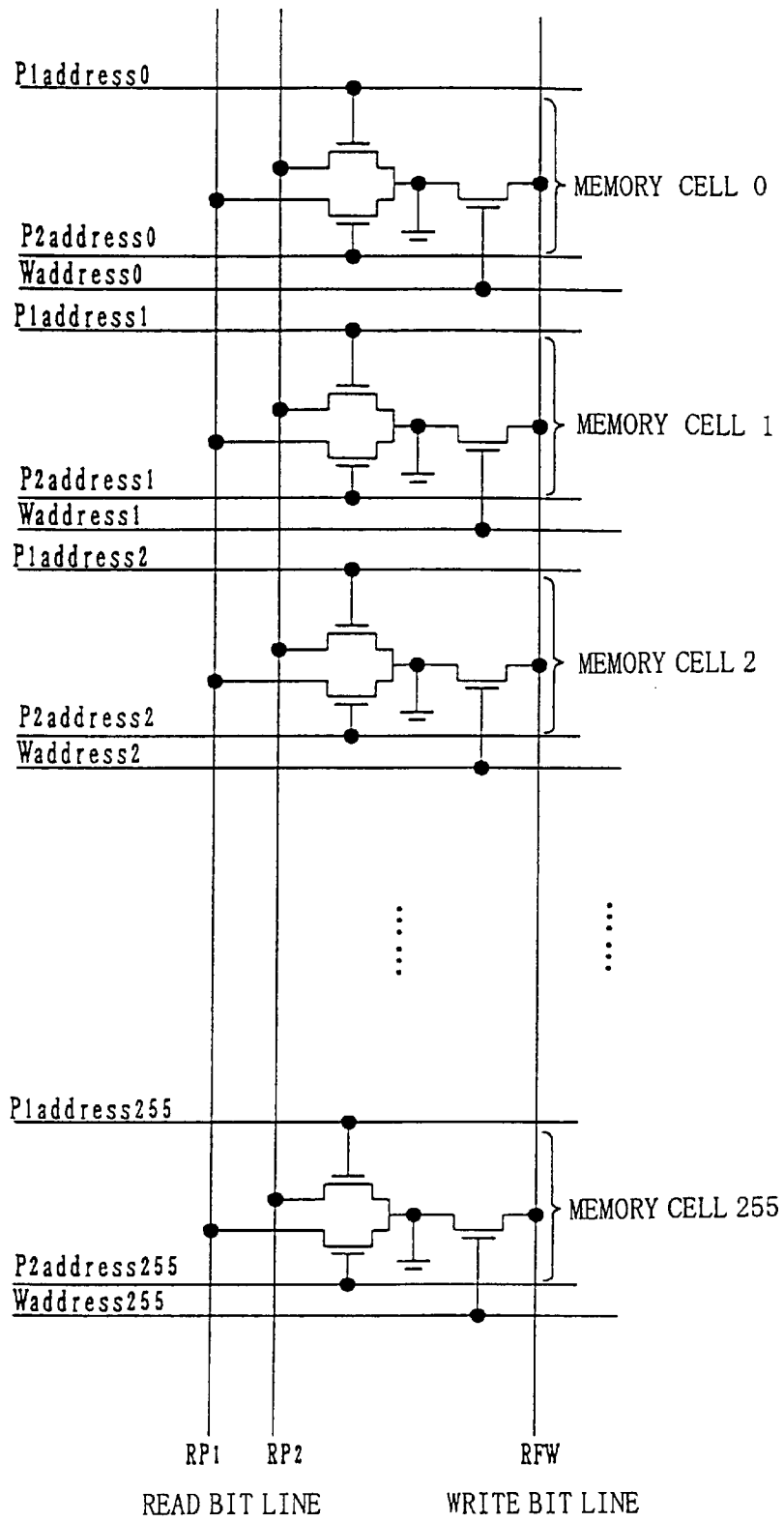
FIG. 4 is a connection diagram showing an example of the configuration of a memory.

FIG. 4 shows the configuration of the memory. This is a three-port memory that independently provides different addresses to respective reads and writes and which comprises 256 bits of memory cells.

(1-2-4) Configuration of the Arithmetic and Logic Unit (ALU)

Figure 5:
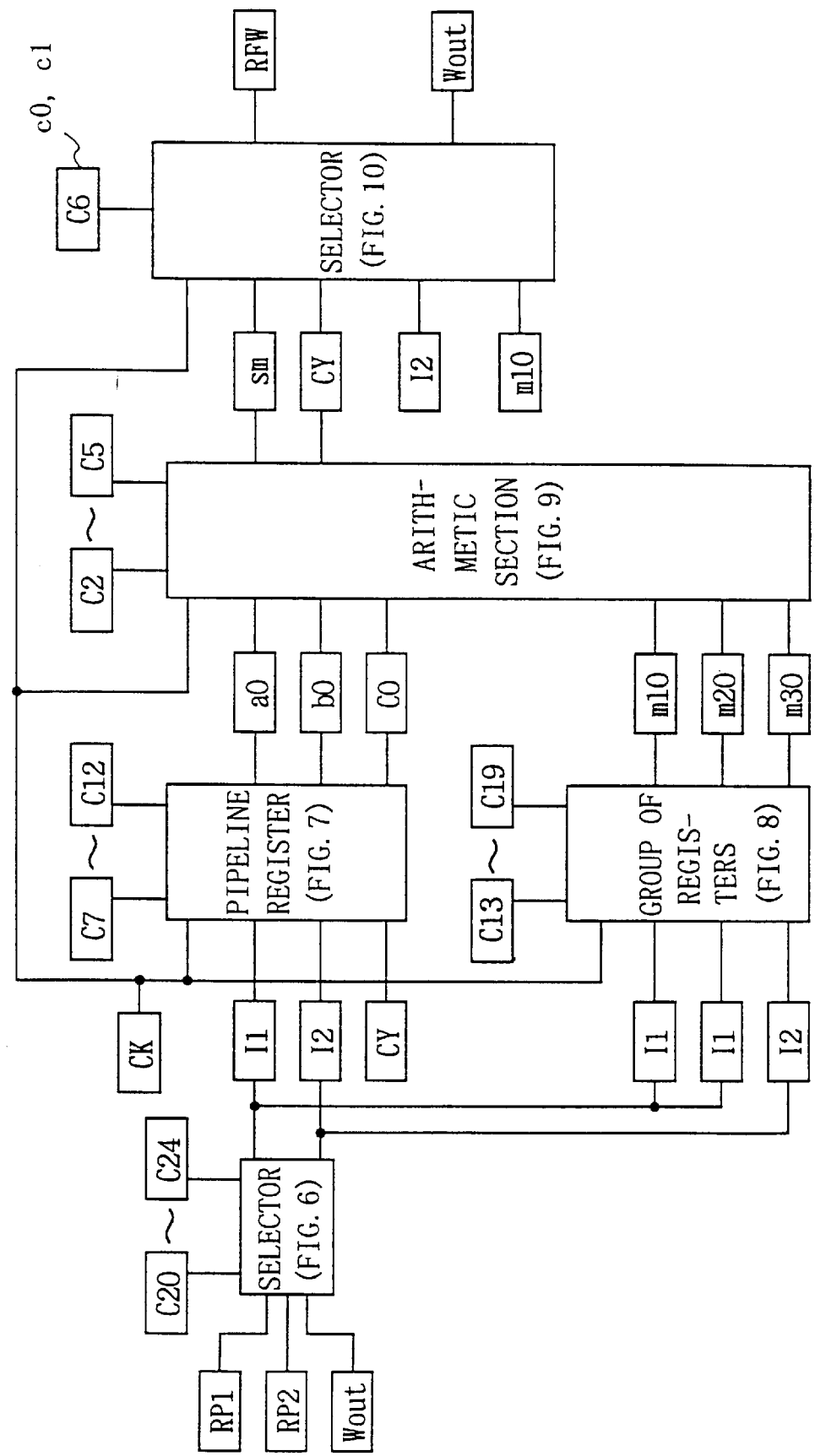
FIG. 5 is a block diagram showing an example of the general configuration of an ALU.

Next, FIGS. 5 to 10 shows the configuration of the ALU. FIG. 5 is a general block diagram showing the relationship among the components shown in FIGS. 6 to 10.

Ports RP1 and RP2 are used to read data from the memory, and provide the values of the memory cells corresponding to read addresses independently specified by the controller.

Figure 10:
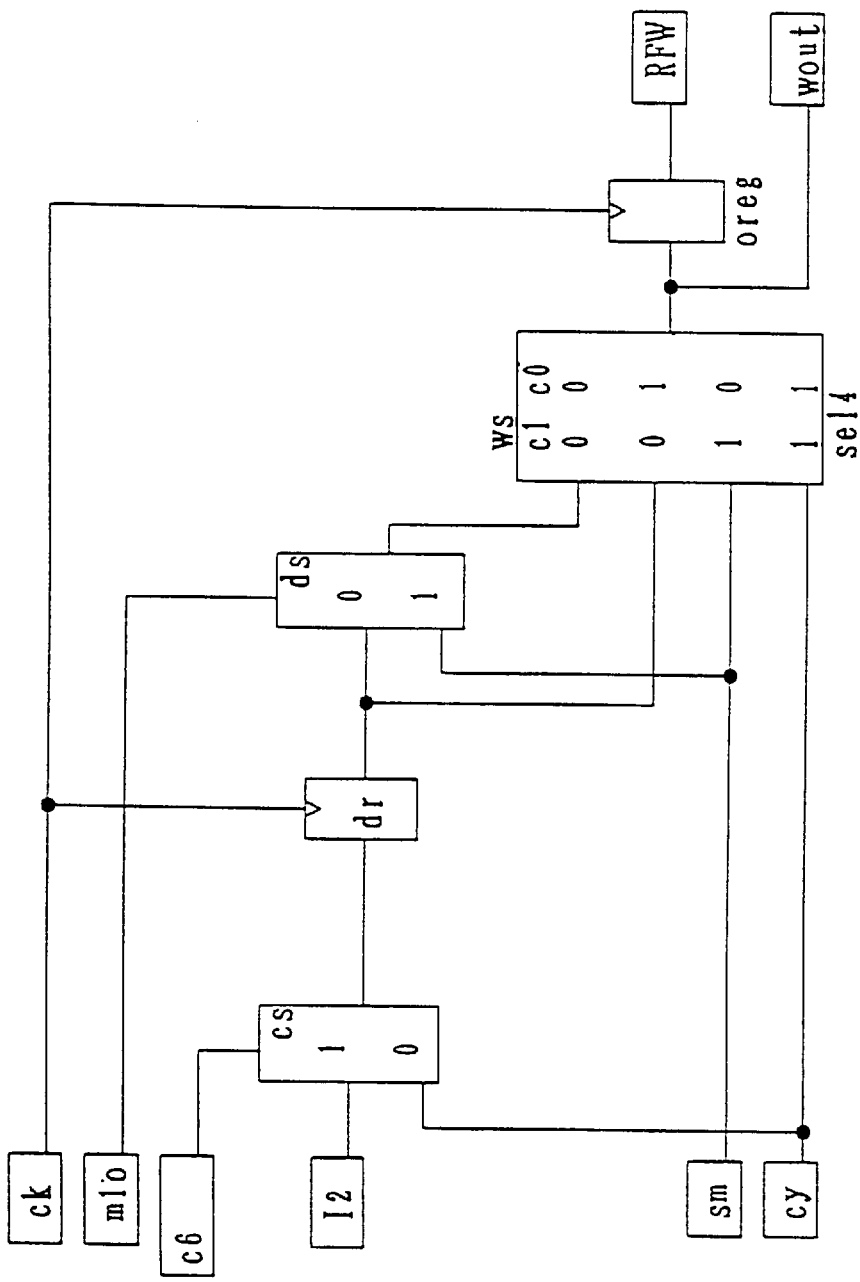
FIG. 10 is a block diagram showing an example of the configuration of selectors constituting the ALU.

A port RFW shown in FIG. 10 is used to write data to the memory, and writes a value to memory cells with write addresses independently specified by the controller or is connected to the write line to the output register OR or to the write line to the mode registers (mode reg) in the input registers IRs and the output register OR.

A 25-bit code shown at C0 to C24 is provided by the controller using the SIMD method. This code uniformly controls all the ALUs within the processor block. The output $W_{OUT}$ of the ALU shown in FIG. 10 is fed back and used as input to the ALU. This feed back input is used when the results of a calculation is used during a subsequent step.

(1-2-4-1) Configuration of the Selector

Figure 6:
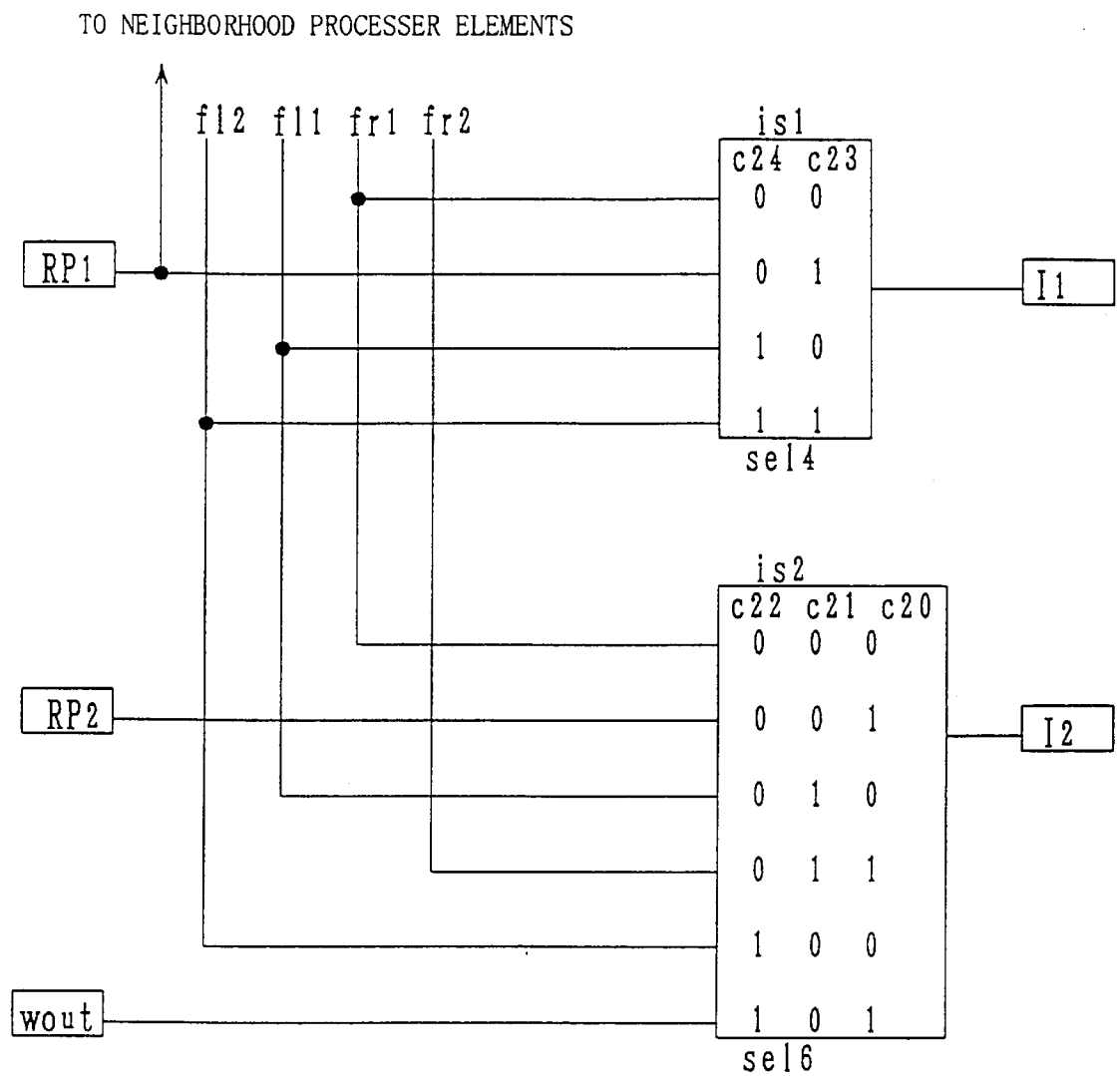
FIG. 6 is a block diagram showing an example of the configuration of selectors constituting the ALU.

FIG. 6 shows the configuration of the selector constituting an input stage for the ALU. The selectors is1 and is2 select values to be used for a calculation from those read from nearby processor elements PE and those of RP1 and RP2 which are read from the memory.

$W_{OUT}$ is the output of the ALU as shown in FIG. 10 and is also fed back and used as input to the ALU. This input is used when the results of a calculation is used during a subsequent step.

Lines shown as fl2 and fl1 are connected to the output of the RF register file of the processor element PE adjacent to one end of a processor element PE, while lines shown as fr2 and fr1 are connected to the output of the RF register file of another adjacent processor element PE. fl1 and fr1 are the output of the RF register files of the nearest processor elements PE, while fl2 and fr2 are the output of the RF register files of the processor elements PE next to the nearest processor elements.

The value read from the memory of the processor element PE to the port RP1 is distributed to nearby processors.

The controller provides control via control lines c20 to c24. The results of selections are passed as I1 and I2 to the pipeline register shown in FIG. 7.

(1-2-4-2) Configuration of the Pipeline Register

Figure 7:
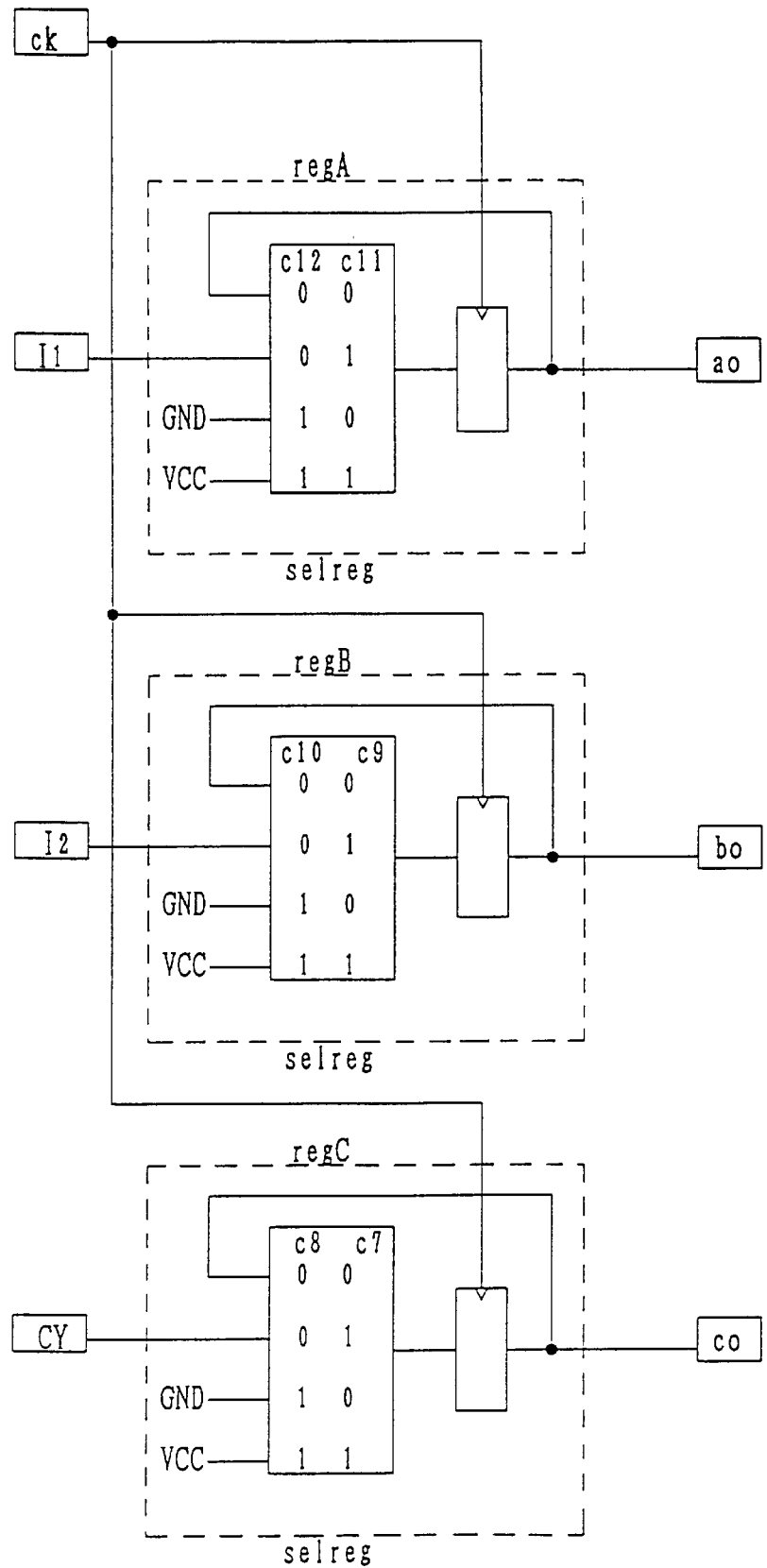
FIG. 7 is a block diagram showing an example of the configuration of pipeline registers constituting the ALU.

FIG. 7 shows the configuration of a pipeline register for selecting or masking input data. In FIG. 7, three registers are provided as a pipeline register so as to correspond to three inputs of the full adder. Two of these registers mainly receive two readouts I1 and I2 from the memory, and the remaining one receives the carry output of the full adder and delays it one clock.

Furthermore, a selector for saving a value latched during the preceding clock and setting it to "0" or "1" is provided. The group of selectors are controlled by codes c7 to c12 from the controller.

(1-2-4-3) Configuration of a Group of Mode Registers

Figure 8:
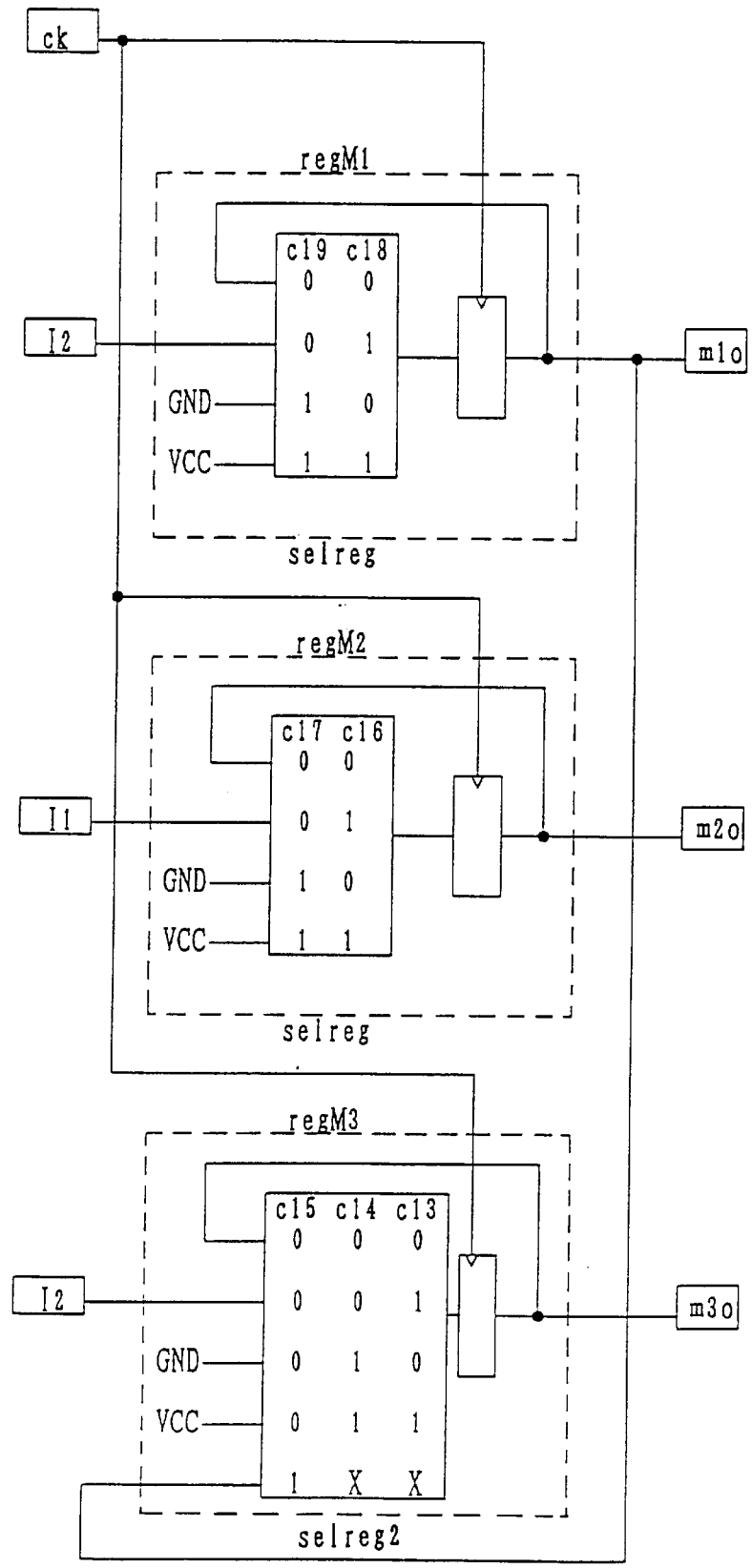
FIG. 8 is a block diagram showing an example of the configuration of mode registers constituting the ALU.

FIG. 8 shows a group of mode registers. The group of mode registers can obtain input from the memory, be set to "0" or "1", and save a value latched during the preceding clock. In addition, the value of a register regM1 can be loaded in a register regM3.

Values latched in this group of registers enable each processor element to operate independently under the control of the codes c13 to c18. The registers regM1 to regM3 output signals m1o, m2o, and m3o, respectively.

(1-2-4-4) Configuration of an Arithmetic Section

Figure 9:
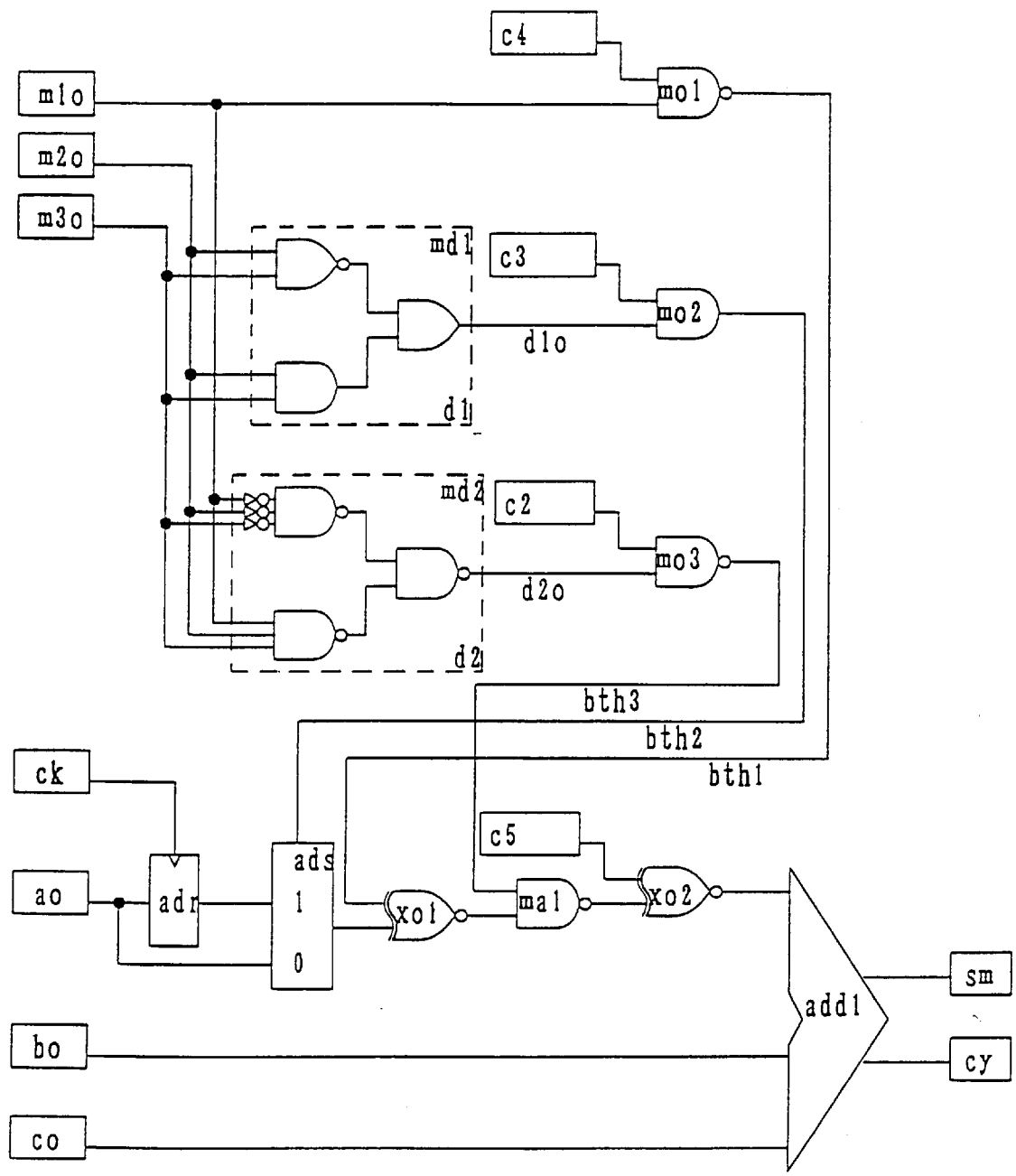
FIG. 9 is a block diagram showing an example of the configuration of an arithmetic section constituting the ALU.

FIG. 9 shows the configuration of an arithmetic section. The full adder is described as add1. The arithmetic section generates a sum SM and a carry CY from three inputs selected by the selectors and a logic circuit.

Based on the signals m1o, m2o, and m3o, and various control signals, the arithmetic section applies one clock delay to a value input as "ao" using "adr", or execute a logical conversion using xo1.

The arithmetic section masks m1o when the code c4 is "0", whereas when the code c4 is "1", it activates control provided depending on that value.

If m1o has a value of "1", xo1 inverts the output of "ads". If both m2o and m3o are "0" or "1", the signal "d1o" is set to "1".

This signal is masked when the code c3 is "0". On the other hand, when the code c3 is "1", control provided depending on the value of d1o becomes active, whereas when d1o has a value of "1", the selector for ads is controlled so as to select between ao and ao delayed one clock by adr.

Delay by the adr register during a calculation such as an addition corresponds to the operation in which data serially read from ao is shifted one bit in the most significant bit (MSB) direction.

When all of m1o, m2o, and m3o are "0" or "1", the signal "d2o" becomes "1".

This signal is masked when c2 is "0". When c2 is "1", control provided depending on the value of d2o becomes active, whereas when d2o has a value of "1", the output of xo1 is set to "0" by "ma1".

The code c5 causes xo2 to invert the output of ma1 and inputs it to the arithmetic and logic unit.

The output of xo2 and inputs "bo" and "co" are input to the full adder add1 to generate a sum SM and a carry CY.

(1-2-4-5) Configuration of a Selector

FIG. 10 shows the configuration of a selector for selecting data to be written to the memory in the final stage. The code c6 first determines a method for using a register CS. When the code c6 is "1", the register CS operates as a pipeline register for the value of I2. When the code c6 is "0", the register CS is used as an element for applying one clock delay to a carry CY output by add1.

Thus, when both a sum SM and a carry CY generated during a certain cycle are to be written to the memory, the sum SM is written thereto during this cycle, and the carry CY is latched in the register CS and then written thereto during the subsequent cycle.

A "ws" selector is controlled by the codes c1 and c0 so as to select among the output of the "ds" register, the output of the "dr" register, the sum SM, and the carry CY.

The output of the ws selector is input to the is2 selector in FIG. 6, latched in "oreg", and output from the ALU as RFW. This output is written to the RF register file or connected to the mode register "modereg" of the input or output register IR or OR or to the write line to the memory cells of the output register OR.

The selector ds is controlled by m1o in FIG. 8 so as to select between the output of the dr register and the sum SM. The processor elements can thus be operated individually.

When the "cs" register selects I2 and the ws selector selects the output of the ds selector, m1o enables I2 and the sum SM to be selectively written back to the memory.

When the cs register selects the carry CY and if the ws selector selects the output of the dr register, the carry CY can be written to the memory after one clock delay.

(1-2-5) Connections within the Processor Block

Figure 11:
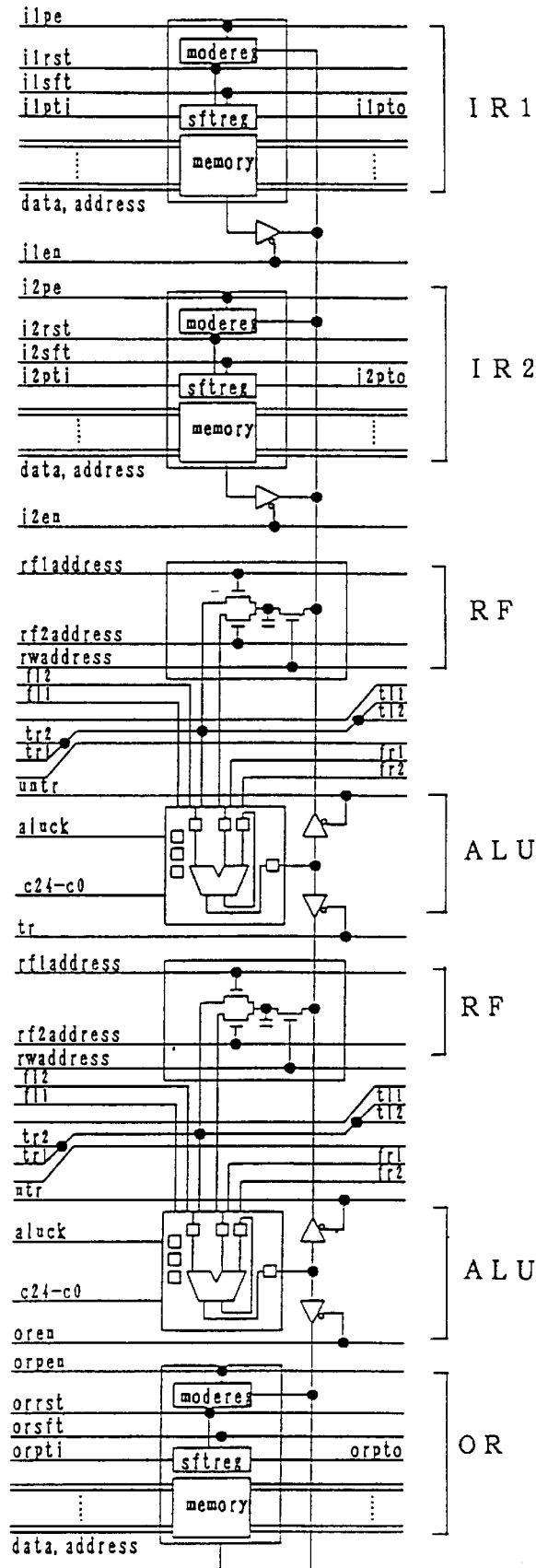
FIG. 11 is a block diagram showing the configuration of the connections in processor blocks.

FIG. 11 shows the configuration of the connections between the processor elements and the input registers IRs and the output register OR.

The input registers IRs and the output register OR are the same as shown in FIGS. 2 and 3 and are typically described. RF in FIG. 11 denotes the memory shown in FIG. 4, and is typically shown as a one-bit memory cell. In this embodiment, however, it comprises 256 bits of memory cells.

One of the read ports is connected to the RP1 port of the ALU, while the other is connected to the RP2 port thereof. The write port is connected to the RFW port. The ALU is the same as shown in FIGS. 6 to 10.

The operation of the overall processor element is described with reference to this figure.

First, the control of IR1 and IR2 is described. "i1pe and i2pe" are used to enable writes to the mode registers (more reg) of IR1 and IR2. When these signals are enabled, the data on the write line driven by the ALU is written to the mode register (mode reg).

"i1rst and i2rst" are signals used to set all the values of the shift registers of IR1 and IR2 to "0" and to clear the pointers to the shift registers (sft reg) within the block when new data is to be written to IR.

"i1sft and i2sft" are clocks for the shift registers of IR1 and IR2, and "1", acting as a pointer for writes, is transferred to shift registers in subsequent elements in synchronism with these signals.

"i1pti and i2pti" are pointer inputs to the shift registers of IR1 and IR2, and are connected to an adjacent element "pto".

"i1pto and i2pto" are pointer outputs from the shift registers of IR1 and IR2, and are connected to an adjacent element "pti".

IR1 and IR2 in the same block are connected to a common data line for sequentially driving write data from the outside of the block. The data is written to the memory cells for elements with "1" located as a pointer in the shift register.

Address is uniformly controlled within the block, and the values of memory cells specified for all the elements are read. Although in this figure, a read value drives the write line to the memory and is directly written thereto, it may be connected to the read line to the memory so that data from RP1 and RP2 is first loaded in the ALU and then written to the memory via the ALU.

Next, the control of the output register OR is described. "orpen" is used to enable writes to the mode register (mode reg) of the output register OR. When this signal is enabled, the data on the write line driven by the ALU is written to the mode register (mode reg).

"orrst" is a signal used to set the value of the shift register of the output register OR to "0" and to clear the pointers within the block when new data is to be written to OR.

"orsft" is a clock for the shift register of the output register OR, and "1", acting as a pointer for writes, is transferred to shift registers in subsequent elements in synchronism with these signals.

"orpti" is a pointer input to the shift register of the output register OR, and is connected to an adjacent element "orpto".

"orpto" is a pointer output from the shift register of the output register OR, and is connected to an adjacent element orpti.

"address" uniformly controlled within the block is used to write data to memory cells, and write data from the ALU is written to the same desired cells for all the elements.

The data lines of the output register OR are bus-connected, so the data in the memory cells for elements with "1" located as a pointer in the shift register can be simultaneously read out from the block.

"tr1 and tr2" are output to an adjacent processor element; tr1 is connected to the fr1 of the adjacent processor element, while tr2 is connected to the fr2 of the processor element adjacent to the adjacent processor element.

"tl1 and tl2" are output to another adjacent processor element; tl1 is connected to the fl1 of this adjacent processor element, while tl2 is connected to the fl2 of the processor element adjacent to this adjacent processor element.

This connection enables each processor element to read data from the memories of the two adjacent processor elements located to either the right or left of this processor element, and supply a value read from the memory to these four adjacent processor elements.

The inside of the ALU is controlled by the control lines C24 to C0, as described above. In addition, the memory is supplied with an address at each port thereof so as to control reads therefrom and writes thereto.

The processor element comprises the ALU and the memory, and two processor elements are placed on each other. The connections between the processor elements and IR1, IR2, or the output register OR are described.

A first processor element reads data from the memory, uses the ALU to process the data, and writes back the results to the memory. It can also carry out writes to the mode registers (mode reg) of IR1 and IR2.

In this case, i1pe and i2pe are enabled, and a value output from the ALU is written to the mode registers (mode reg). When data is to be read from IR1 and IR2 and written to the memory, i1en or i2en is enabled, "untr" is disabled, and an address of the memory to be written to is supplied.

Like values from the memory, values read from IR1 and IR2 may be connected to the read ports RP1 and RP2 of the ALU, loaded in the ALU, and written back to the memory after some processing.

A second processor element reads data from the RF memory, uses the ALU to process the data, and writes back the results to the RF memory. It can also carry out writes to the mode register (mode reg) and memory cells of the output register OR. Values output from the ALU can be written to the mode register (mode reg) of the output register OR by enabling "oren" and orpen.

Data can also be written to the memory cells of the output register OR by enabling oren.

A value output from the ALU in the first processor element can be passed to the second processor element.

A value output from the ALU in the first processor element can be written to a desired address of the memory in the second processor element by enabling a "tr" signal to drive the output value to the write bit line to the memory of the second processor element while disabling an "ntr" signal for the second processor element. Data can thus be transferred from the first processor element to the second processor element. Although this embodiment has been described in conjunction with two processor elements placed on each other, it can be extended to more processor elements placed on one another.

(1-2-6) Connections a mong the Processor Blocks

Figure 12:
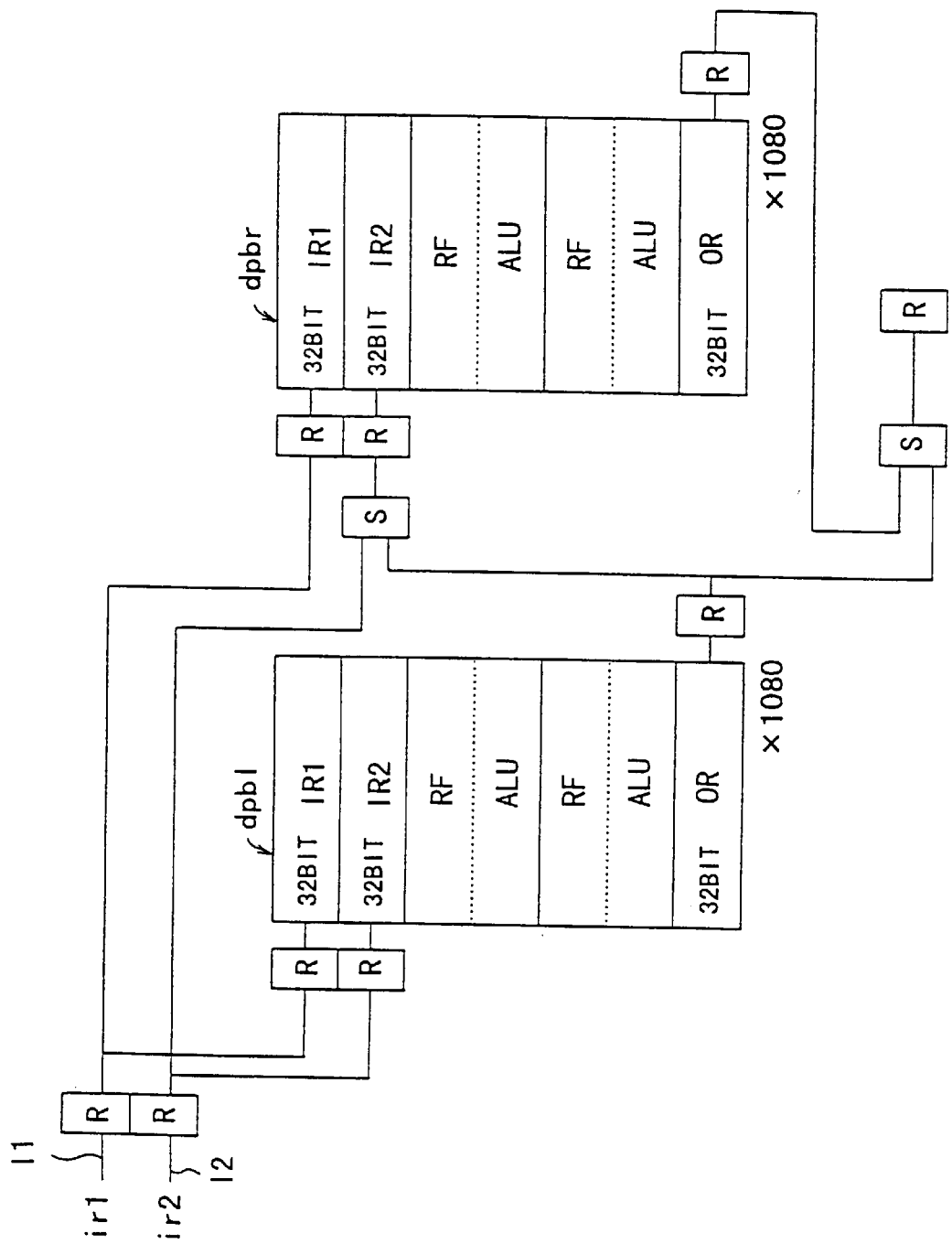
FIG. 12 is a block diagram showing the configuration of the connections between processor blocks.

FIG. 12 shows connections between the processor blocks. Two connection methods for two processor blocks are described with respect to two different modes.

(1-2-6-1) HD Mode

One of the modes is an HD mode. In the HD mode, two processor blocks called "dpb1" and "dpbr" are connected and used as a single block. The selectors for IR1 and IR2 in each block are controlled so that data input from outside the chip is directly input to IR1 and IR2 via a number of registers. This drives input values on data signal lines I1 and I2 to IR1 and IR2 in the block.

The same control signals for IR1, i1rst and i1sft, are provided to both blocks. A pointer input indicating the beginning of data loading is input to only "ilpti" that is sent to one end of the block dpbl. After this pointer has been sequentially propagated through dpbl, "ilpto" output from the processor element at the other end of dpbl is input to i1pti that is sent to one end of dpbr. The pointer is then propagated through dpbr to load input data therein. The same is true of IR2.

The processor element at the terminal of dpbl and the processor element at the terminal of dpbr are connected together so as to communicate with each other like processor elements inside the block.

The controllers 3A and 3C shown in FIG. 1 must be provided with exactly the same programs and control codes and perform the same operations with the same timings. The controllers 3B and 3D shown in FIG. 1 must also perform the same operations. Due to the control by the same control programs, the i1pe and i2pe addresses are provided in the exactly the same manner.

The control of the output register OR by orsft and orrst is exactly the same for dpbl and dpbr, and a pointer for providing an initial timing for obtaining pixels is input to only orpti that is sent to dpbl.

Output orpto from the processor element at the terminal of dpbl is input to orpti from the processor element at the terminal of dpbr, and the pointer is sequentially transferred through dpbl and then through dpbr.

The data lines are bus-connected together within each block, and driven by pixels written to an element specified by the pointer.

Data output from the block is latched in a number of registers, and a selector is then used to select among values output from blocks with the pointer present therein, with the result output from the chip.

This selector can be controlled by the output of the reset set flip flop (RSFF) that is set by pti sent to each block and reset by pto. Each block may be provided with such an RSFF, and this selector may select the output of blocks with the output of the RSFF being "1".

As a result, in the HD mode, the two blocks comprising 2,160 processor elements can be operated as a single block.

The RSFF described in the output register OR is also provided in each block for the pointers for IR1 and IR2.

The output of the RSFF controls the driving of the write bit line to the IR1 and IR2 in the block.

In blocks without the pointer, no writes occur, so the driving of this bit line is controlled to reduce power.

(1-2-6-2) SD Mode

Next, a standard (SD) mode is described. The SD mode independently controls two blocks shown in FIG. 12. The controllers 3A to 3C shown in FIG. 1 are independently operated by independent programs. Only the output register OR of the processor block dpbl and the IR2 of the processor block dpbr cooperate with each other.

In the SD mode, the selectors are controlled so as to select the output of the output register OR of the processor block dpbl as input to IR2.

A common clock is used for both orsft sent to the processor block dpbl and i2sft sent to the processor block dpbr. Due to delay by the registers from the output register OR to IR2, i2rst and i2pti are input to the processor block dpbr later than orrst and orpti sent to the processor block dpbl. This causes the output of the output register OR to be provided as input to dpbr.

Output from the chip controls the selector for the output section so as to select the output of the output register OR of the processor block dpbr.

(1-2-6-3) Data Flow

Next, data flow is described. In the HD mode, 2,160 or less data bits are sequentially written to the input registers IR1 and IR2 from the input ports I1 and I2.

The input registers IR1 and IR2 can operate independently in order to deal with applications that must input data with independent timings in order to use an external frame memory to input the current frame and an image delayed one frame relative to the current frame or in order to input delayed pixel data to cancel ghosts.

Once data has been written to the input registers IR1 and IR2, the first processor element controlled by the controllers 3A and 3C shown in FIG. 1 reads this data, executes various processing, and passes the processed data to the second processor element.

The second processor element also processes data and writes it to the output register OR under the control of the controllers B and D in FIG. 1. The content of the output register OR is subsequently read out from the chip.

In the SD mode, 1,080 or less data bits are sequentially written to the input registers IR1 and IR2 in the processor block dpbl from the input ports I1 and I2.

Once the data has been written to the input registers, the first processor element reads data from the input registers IR1 and IR2, executes processing, and passes the processed data to the second processor element according to the controller 3A in FIG. 1.

After executing processing, the second processor element writes data to the output register OR.

After the processing in the processor block dpbl has been finished, the data is transferred from the output register OR to the IR2 in the processor block dpbr, read and processed by the first processor element in the processor block dpbr controlled by a processor 3C, and passed to the second processor element.

The second processor element receives, processes, and writes data to the output register OR of the processor block dpbr. Data that has been subjected to a series of processing is read out from the chip through the processor block dpbr.

Reads to the input registers IR as well as the first and second processor elements, and the output register OR can operate independently in parallel, so the above data flow can use pipeline operations with 2,160 or 1,080 or less data bits as a unit.

For images, 4-line delay occurs in the HD mode, while 6-line delay occurs in the SD mode.

In the HD mode, a period of time corresponding to two lines is assigned as image processing time for each pixel, while in the SD mode, a period of time corresponding to four lines is assigned as image processing time.

I/Os and processor blocks can operate independently so as to deal with applications such as frequency cross-over by means of programming.

The input of a pointer to pti must synchronize with the timing for the external input of data or for the external readout of data, and two modes are set for this method.

One method explicitly inputs pulses as this pointer in synchronism with sft clocks. In this case, to which element each pixel has been written can be clearly specified. The start pulse externally input is delayed by a number of registers to generate "rst" and pti signals.

The other method employs a signal (an act signal) that notifies the controller of readable and writable timings provided by the input registers IR1 and IR2 and the output register OR.

The act signal notifies the controller that data is being written to the input register IR or that data is being read from the output register OR. When this signal is disabled, the controller reads data from the input register IR or writes data to the output register OR.

When data is read from the processor element when this signal is being enabled, both elements filled with new data and elements with previously written data remaining therein exist, thereby preventing normal processing.

According to this invention, pulses are generated at the rising or falling edge of this signal in synchronism with sft clocks to generate rst and pti signals, as described above. This is a function for generating pulses for a single clock on a substrate external to the chip in order to reduce costs.

Sync and blanking signals, which are normally provided to process image data, may be used as act signals.

(1-3) Configuration of the Controller

Figure 13:
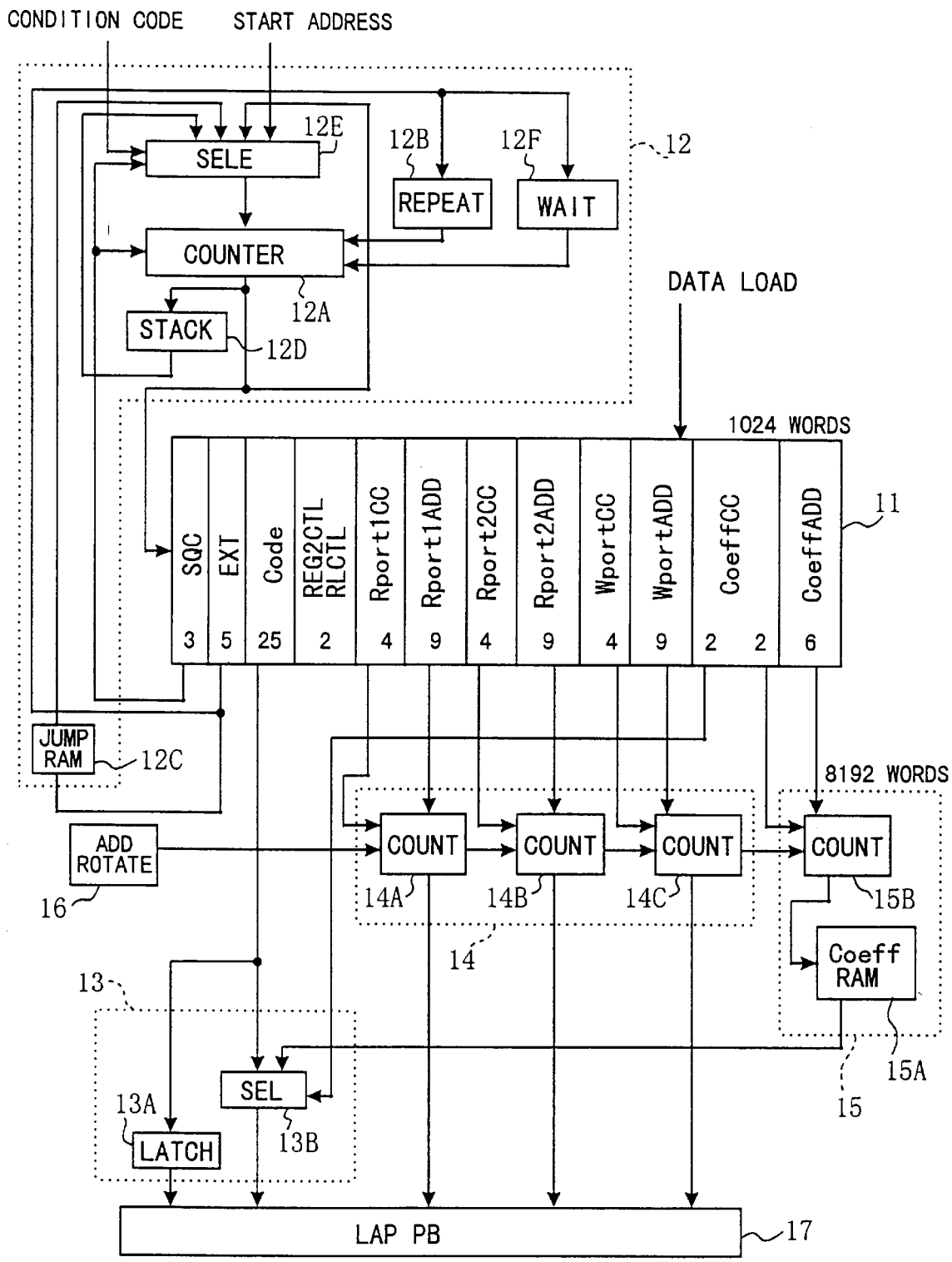
FIG. 13 is a block diagram showing the configuration of a control circuit.

FIG. 13 shows the configuration of the controllers 3A to 3D. The digital signal processor 1 shown in FIG. 1 has these four controllers 3A to 3D that substantially consists of a common circuit except for a number of I/O related sections.

Each of the controllers 3A to 3D comprises a program memory called a code RAM 11, a sequence control circuit 12, an ALU code generation circuit 13, a memory address generation circuit 14, a coefficient RAM circuit 15, and an address rotation circuit 16.

The code RAM 11 has 1,024 words and a width of 84 bits. The code RAM 11 may comprise a SRAM, be externally loaded, or comprise a mask ROM.

The controllers 3A to 3D have a horizontal architecture with fields clearly assigned their specific functions. These fields are described below.

(1-3-1) Configuration of the Sequence Control Circuit

The sequence control circuit 12 is first described. The sequence control circuit 12 comprises a 10 bit counter 12A for generating addresses of the code RAM 11 (the code RAM has 1,024 words of addresses), a repeat counter 12B, a 32 bit jump destination address RAM 12C, and a stack register 12D.

The sequence control circuit 12 uses an "sqc" and "ext" fields of the code RAM 11 to control the sequence for the code RAM 11.

The contents of sequence control provided by the sqc and ext fields are as shown in FIG. 14.

CONT is an instruction for incrementing the counter.
JUMP is an instruction for jumping to that address written in advance in a jump destination address RAM which is specified by the five bits in the ext field.

JPCC jumps to that address written in advance in the jump destination address RAM which is specified by a five-bit control code provided to each of the four controllers from outside the chip.

RTN jumps to an address of the stack register to pop this register.

JSUB pushes the address next to the current address into the stack register, and jumps to that address written in advance in the jump destination address RAM which is specified by the ext field.

RPT loads in the repeat counter a value specified by the ext field, decrements this value, and remains at the same address until the value becomes "0". The counter is then incremented.

RPTR carries out repetitions similar to those in RPT, and jumps to an address of the stack register to pop this register.

WAIT monitors signals provided from outside the chip, and remains at the same address until a specified condition is achieved. The signal to be monitored, for example, the act signal is specified by the exit field.

The act signal indicates the input and output condition of I/O circuits such as the input registers IR1 and IR2 and the output register OR. It indicates the timing with which the processor elements in the first group are allowed to read data from the input registers IR1 and IR2 or the processor elements in the second group are allowed to write data to the output registers OR.

The sequence control circuit 12 monitors a desired act signal, and once this signal has been allowed, prevents operations such as reading data from the input registers IR1 and IR2 or writing data to the output register OR in order to read data from the input registers IR1 and IR2 while data is being written to these registers, to externally read data from the output register OR, or to attempt a write while data is being transferred from the processor block dpbl to the processor block dpbr.

This wait function is also used to transfer data from the processor elements in the first group to the processor elements in the second group.

Figure 15:
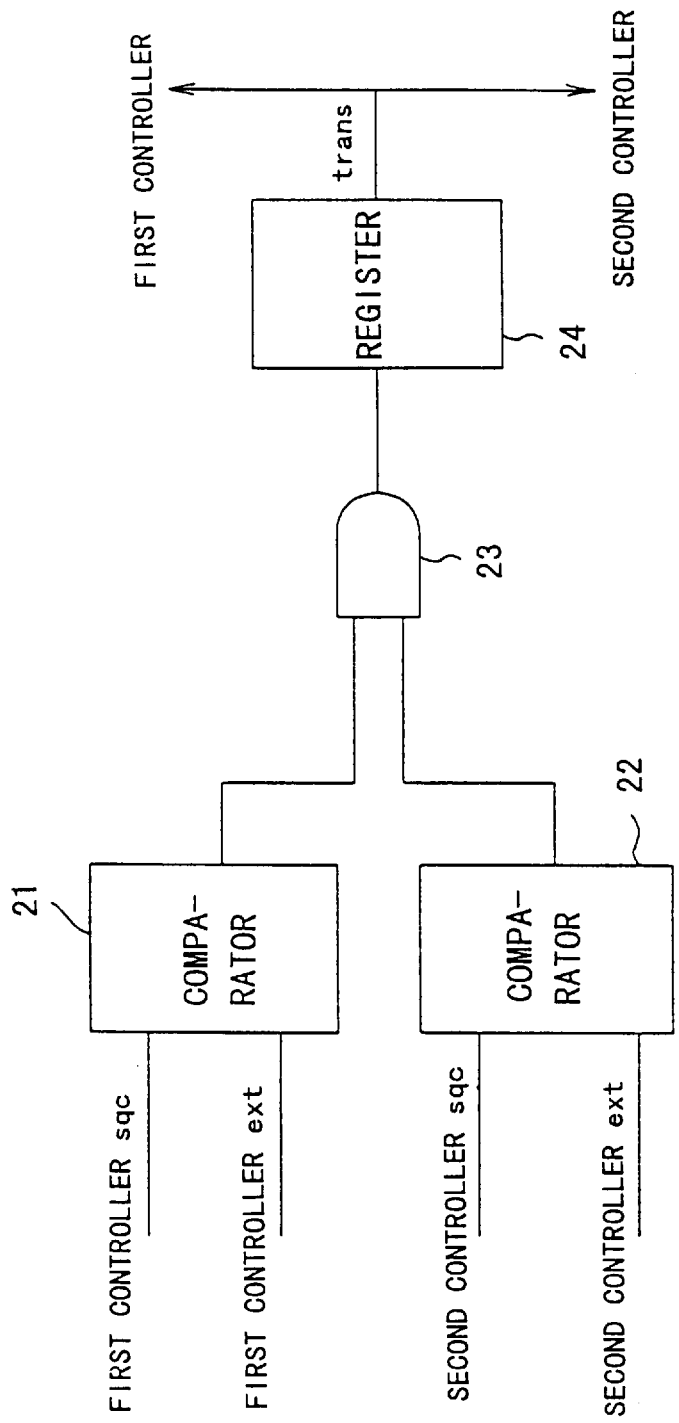
FIG. 15 is a block diagram showing the configuration of a transfer timing adjustment circuit.

The controllers 3A to 3D in FIG. 1 must cooperate with one another in transferring data from the processor elements in the first group to the processor elements in the second group. The processor blocks dpbl and dpbr each have a circuit shown in FIG. 15. sqc and ext from the first controller 3A or 3C are input to a comparator 21, while sqc and ext from the second controller 3B or 3D are input to a comparator 22.

The condition specified by sqc is WAIT, while the condition specified by ext is a "trans" signal. While the comparators 21 and 22 are waiting for the trans signal to be enabled, "H" (enable) is output from each output end.

When the first and second controllers both have met this condition, these signals are latched in the register and communicated to the first and second controllers as a trans signal. The first and second controllers can then synchronously transfer data.

The first controller outputs the output of the ALU to the second controller, while the second controller specifies an address to which that value is to be written.

In addition, in the case of images, a signal called Vsync for specifying the timing for frames or fields can be selected as a wait condition.

(1-3-2) Configuration of the ALU Code Generation Circuit

Next, an ALU code generation circuit 13 is described. The 25-bit code field of the code RAM 11 controls each section of the ALU. The code generation circuit 13 has a number of pipelines registers. In particular, for the codes c0 to c6 for controlling the ALU, the code generation circuit 13 latches a value in an additional register before inputting it to the control line to the processor block, in order to accommodate the pipeline configuration inside the ALU.

The codes c20 to c24 are the input control signals shown in FIG. 6, and are stored in a special register when the reg2ctl field of the code RAM 11 is enabled. Once the "rlct" field of the code RAM 11 has been enabled, the value of the register is used as the code c20 to c24 instead of the value of the code field. This usage is described in the section of an address generation circuit.

In addition, the 2 bit/1 word output of the coefficient RAM 11 is input to the code generation circuit 13. The two bits in the "coefcc" field of the code RAM 11 are assigned to control this output. FIG. 16 shows the relationship between the coefcc field and the contents of control.

When cc is "0", the code of the code RAM is provided to the ALU without changes. When cc is "1", two bits supplied from a coefficient RAM circuit 15 are used to control c18 and c16. These two bits are a code that controls the selector in FIG. 8, and setting c19 and c17 to "1" causes the value of the two bits of the coefficient RAM to be stored in regM1 and regM2. This enables multiplication with constant coefficients to be executed easily, and this method is described below.

If cc is "2" or "3" either of the two bits of the coefficient RAM is used to control c11. c11 controls the selector in FIG. 7, and setting c12 to "1" enables either of the values of the two bits of the coefficient RAM 15A to be stored in regA. This enables the value of the coefficient RAM to be loaded in RF via regA.

(1-3-3) Configuration of the Coefficient RAM Circuit

The control of the coefficient RAM circuit 15 is described. Each of the controllers 3A to 3D has a coefficient RAM. The coefficient RAM 15A has a width of two bits and contains 8,192 words. These two bits are used in the code generation circuit 13, and loaded in regM1, regM2, and regA so as to be used as a multiplier for a multiplication. These two bits are also used in the code generation circuit 13, and loaded in regM1, regM2, and regA so as to be loaded later in the memory to supply data for various other processing. An address of the coefficient RAM 15A is specified by a 13 bit address counter 15B.

The address counter 15B uses two bits in the coeffcc field of the code RAM 11 to specify an address of the coefficient RAM 15A. FIG. 17 shows an example of the operation of the address counter 15B.

When for example, "ce" is "0", the address counter 15B loads six of the 13 bits of the "coeffadd" field of the code RAM 11 as MS6 bits, and inputs "0" as LS7 bits. In this case, if sqc is a repeat instruction, the value is held during repetitions.

When ce is "1", the address counter 15B loads six of the 13 bits of the coeffadd field of the code RAM 11 as MS6 bits, and inputs "0" as LS7 bits. In this case, if sqc is a repeat instruction, this counter is incremented during repetitions.

When ce is "2", the address counter 15B holds the value.

When ce is "3", the address counter 15B increments a value obtained during the preceding clock before providing it to the coefficient RAM 15A.

If the address rotation circuit 16 specifies a particular address region and provides a step value to the coefficient RAM circuit 15, the circuit 15 adds to this value a step value provided when the address in the "coefadd" field of the code RAM 11 was loaded. If the sum is outside the specified region, this sum minus the address width of the region is loaded in the address counter 15B. FIG. 18 shows associated determination conditions.

Even when the address rotation circuit 16 specifies a particular address region and delivers a step value to the coefficient RAM circuit 15, if this step value plus a step value provided when the address in the coefadd field of the code RAM 11 was loaded is within the specified region, this sum is directly loaded in the address counter 15B.

This enables several types of coefficients to be cyclically used on an image data line basis, and also enables different coefficients within a predetermined region of the coefficient RAM 15A to be used despite the use of the same program in the code RAM 11 to generate the same coefadd.

(1-3-4) Configuration of the Memory Address Generation Circuit

Next, the memory address generation circuit 14 is described. A different address may be specified for each of the three ports of the memory of each processor block. The controllers 3A to 3D thus each incorporate three address counters.

These three address counters 14A to 14C have the same basic functions, so their circuit is first described, and some difference among them is then explained.

The Rport1CC, Rport2CC, and WportCC of the code RAM 11 control these counters 14A to 14C, while the Rport1ADD, Rport2ADD, and WportADD of the code RAM 11 specify addresses.

These three address counters 14A to 14C are each a nine bit counter, and their address map is shown in FIG. 19. These addresses are used as addresses of the memory of a processor block via a number of pipelined registers. For write addresses, two additional pipelined registers are usually used to accommodate pipeline operations inside the ALU.

A memory address consists of eight bits to enable the addressing of 256 bits of memory cells, as shown in the memory. The input registers IRs and the output register OR are mapped on these addresses.

The controllers, however, cannot specify elements for which hardware does not exist. For example, data cannot be read from the output register OR or written to the input registers IRs.

In this example, when the most significant bit (MSB) is "0", each address counter specifies a memory address. The address line of the memory is then driven, so that data can be read from or written to the memory cell corresponding to a specified address.

For the controllers 3A and 3C for the first processor element, the MS4 bits of "1000" or "1001" mean reading from the input registers IR1 and IR2. The controllers drive the specified address line of a memory cell of the input registers IR1 and IR2 in FIG. 2, enable i1en and i2en in FIG. 11, and disable "nntr".

In this case, since a value read from this memory cell directly drives the write line of the memory, the registers corresponding to the two pipelined ALUs placed on the write address are passed.

If the MS4 bits of the write address is "1100" or "1101", the mode register (mode reg) in FIG. 2 is specified, and i1pe and i2pe are enabled.

When the MS4 bits of the write address are "1010", the controllers 3B and 3D for the second processor element drive the write address line of a memory cell of the output register OR, and enables oren to drive the output of the associated ALU to the write bit line to the output register OR. This causes the data to be written to the output register OR.

When the MS4 bits of the write address is "1110", the more register (more reg) in FIG. 3 is specified and orpen is enabled so that the output of the ALU can be written to the mode reg.

When data is transferred from the first processor element to the second processor element, the MS4 bits are set at "1010" in the first processor element to specify a write to the output register OR. The tr signal in FIG. 11 is enabled, the ntr signal is disabled, and the output value of the first ALU drives the write line of the second processor element. This causes the data to be written to an address generated by the second controller. This operation is performed after timing adjustment has been carried out by the timing adjustment circuit shown in FIG. 15.

The address generation circuit 14 incorporates an address register in addition to address counters 14A to 14C, which is controlled according to the conditions shown in FIG. 20. This address register increments its value when the most significant bit (MSB) of the corresponding control code is enabled, and enabling the reg2ct1 field of the code RAM allows the value of each address field of the code RAM to be loaded in this register. This usage is described below.

The address counters 14A to 14C is explained again. The address counters 14A to 14C are controlled using the least significant (LS) three bits in the Rport1CC, Rport2CC, and WportCC fields. FIG. 21 shows the control conditions, which are explained below.

In the case of "0", the value of the relevant address field of the code RAM 11 is loaded in the address register. If this is a repeat instruction, this value is held.

In the case of "1", the value of the relevant address field of the code RAM 11 is loaded in the address register. If this is a repeat instruction, this value is incremented during repetitions.

In the case of "2", the value latched in the address counter described above is loaded in the address register. Even when this is a repeat instruction, this value is held.

In the case of "3", the value latched in the address counter described above is loaded in the address register. When this is a repeat instruction, this value is incremented during repetitions.

In the case of "4", the address latched during the preceding clock is held.

In the case of "5" or "7", the address latched during the preceding clock is incremented.

In the case of "6", the address latched during the preceding clock is incremented, and if this is a repeat instruction, this value is held.

If the address rotation circuit 16 specifies a particular address region of the memory and a step value, this step value is added to the memory address in this address counter, and the sum is provided to the processor block as shown in FIG. 22. If the sum is outside the specified region, the address width of the region is subtracted from the sum, and the result is provided to the processor block.

This enables memory regions to be cyclically used on a line basis, and also enables a number of regions to be cyclically used despite the use of the same program in the code RAM 11 to program accesses to the same memory region.

(1-3-5) Configuration of the Address Rotation Circuit

The configuration of the address rotation circuit 16 is described with reference to FIGS. 23 and 24. The address rotation circuit 16 comprises a register for storing externally provided rotation information and a circuit for calculating step value information. The address rotation circuit 16 supplies address rotation information to the address counter 15B of the coefficient RAM 15A and the address counters 14A to 14C of the address generation circuit 14.

The functions of the address rotation circuit 16 are described using an example of operation on memory addresses. In this example, particular processing is carried out in the oblique line part in FIG. 23, that is, from "128" to "191", and rotations with this region divided into four are executed.

When the address counter points to a location outside this region, the address rotation circuit 16 is passed, and the address of the location is directly provided to the processor block.

Figure 23:
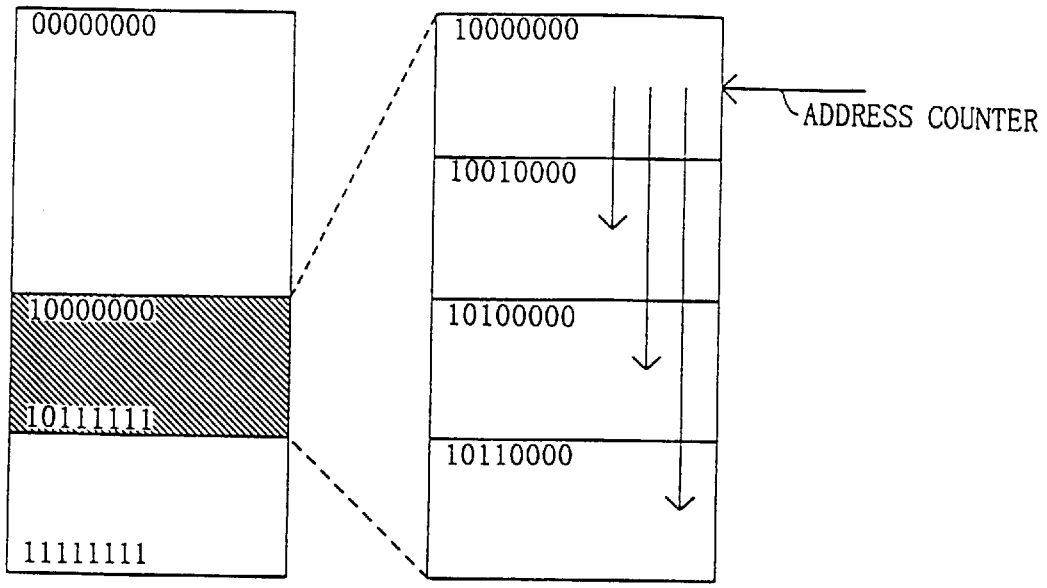
FIG. 23 is a schematic diagram showing an example of operations on the value of an address counter.

As shown in the right of FIG. 23, when the address counter points to a location within this region, the step value is added and delivered to the processor block. The step value is provided as a multiple of the width of the specified region divided by the number of divisions. In this case, the step unit is "16", so the step value is either "0" or "16" or "32" or "48", and is cyclically set in response to signals provided from outside the chip. After "48", the step value returns to "0".

By depending on this step value, when the address counter specifies, for example, "129", either "129" or "145" or "161" or "177" can be selected without depending on the program in the code RAM 11. If the sum is outside this region, the width of this region is subtracted from it. When for example, "177" is specified by the address counter, the address obtained by the addition of the step value is "177", "193", "209", or "225". The last three values, however, are outside this region, so "177", "129", "145", and "161" are pointed to and provided as addresses for the processor block.

The information provided from outside the chip is the number "num" of the divisions of the region from "endadd" to "stadd" which is held in the register inside the address rotation circuit.

Figure 24:
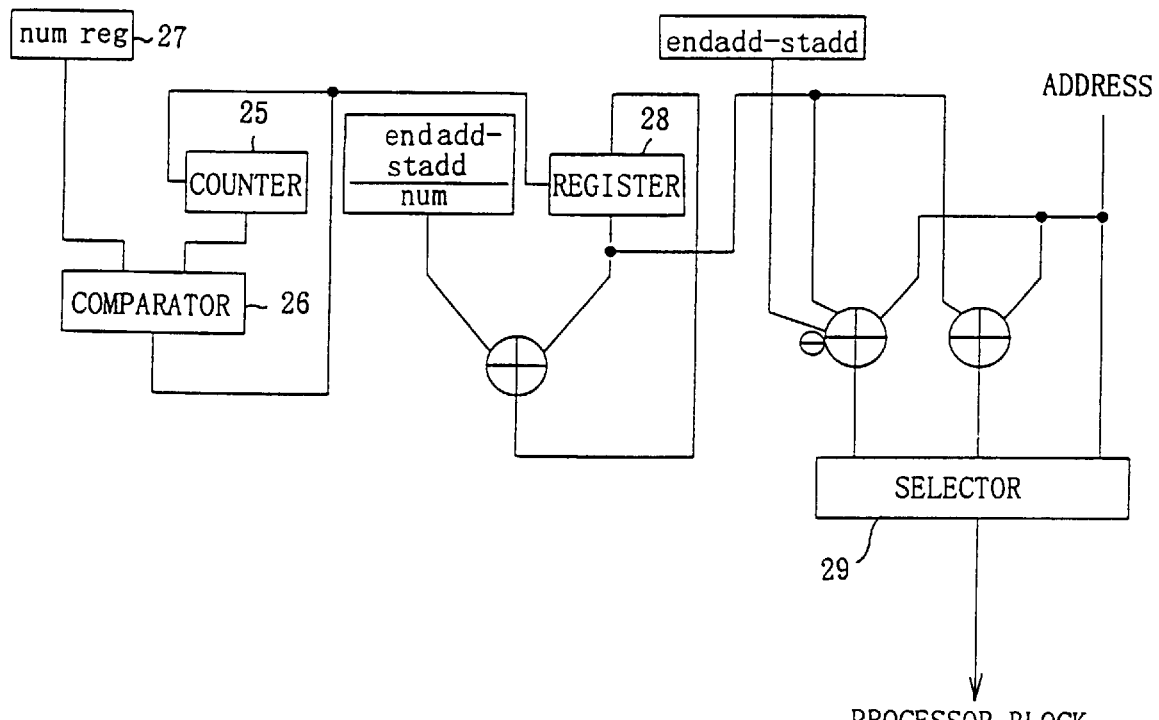
FIG. 24 is a block diagram showing a circuit for calculating step values used by an address rotation circuit.

FIG. 24 shows a circuit for calculating the step value. When activated by a signal externally provided for rotating the step value, this step calculation circuit updates the value.

When this signal is input, a counter 25 is incremented and compared to the value of num reg 27 by a comparator 26. If the values match, the step calculation circuit clears the counter 25 and a register 28 in response to the subsequent rotation signal.

Each time the rotation signal is activated, (endadd-stadd)/num that is a step unit is added to the register 28, which is cleared when the counter 25 becomes "0".

The value of the register 28 is provided to the address generation circuit 14 as a step value. In the address generation circuit 14, a selector 29 selects one of the following three values which meets the above condition: the original address obtained from the address counter 25 plus this step value, the original value plus this step value minus (endadd-stadd), and the original value. The selected value is provided to the processor block.

A similar configuration is used to execute address rotations for the coefficient RAM 15A.

(2) Processing Operations

The controllers have the above configuration. The controllers need to load address rotation information in the code RAM 11, the coefficient RAM 15A, and the jump destination address RAM 12C. If this information is externally input, then in the HD mode, the controllers 3A and 3C, 3B and 3D in FIG. 1 must operate under the same program. In the HD mode, data is simultaneously input to all the controllers.

The digital signal processor 1 of this configuration can carry out various processing by means of programming. This section describes this programming method as well as relevant applications.

(2-1) Logical Operation Processing

First, the ability to execute various logical operations is described with reference to FIGS. 6 to 10.

A NOT operation is performed by inputting to regA data read from I1, disabling C2, C3, and C4, enabling C5, using xo2 to invert this value, setting regB and regC to "0", and writing the sum SM back to the memory RF.

An AND operation is performed by reading data from I1 and I2, disabling C2, C3, C4, and C5, inputting the data to regA and regB, setting regc to "0", and writing the carry CY back to the memory RF.

An EOR operation is performed by reading data from I1 and I2, disabling C2, C3, C4, and C5, inputting the data to regA and regB, setting regc to "1", and writing the carry CY back to the memory RF.

An EOR operation is performed by reading data from I1 and I2, disabling C2, C3, C4, and C5, inputting the data to regA and regB, setting regc to "0", and writing the sum SM back to the memory RF.

A combination of these operations enables all the required logical operations.

The shift operation of numeric values can be performed easily by controlling read addresses.

(2-2) Arithmetic Operation Processing

Next, arithmetic operations are described. It is assumed that numeric values are sequentially stored in arbitrary addresses of the memory from the least significant bit (LSB) to the most significant bit (MSB). This is to accommodate the circuit configured so as to allow the address counter to execute only incrementations, and in normal calculations, numeric values may be processed from their least significant bit (LSB).

When it is read from the most significant bit (MSB), the address may be specified from the code RAM 11 every time.

This circuit allows additions and subtractions to be executed easily in terms of the complement of two.

Two values obtained via I1 and I2 and placed in arbitrary locations of the memory are sequentially read from their least significant bit (LSB).

C2, C3, C4, and C5 are disabled, and the two read values are input to the full adder. During the calculation of the least significant bit (LSB), regc remains at "0", but during subsequent calculations, the carry CY from all the steps is stored in regc, and this value is selected. This enables additions.

In addition, a value provided via I1 can be subtracted from a value provided via I2 by enabling C5, inverting data from regA, and setting regc at "1" during the calculation of the least significant bit (LSB).

Controlling the coefcc field of the code RAM 11 enables regA to be controlled using the output of the coefficient RAM, and values from the coefficient RAM 15A can be used for additions and subtractions instead of data from I1.

(2-3) Multiplication Processing

Next, multiplication are explained. A method for programming multiplication often used for signal processing is shown with reference to the configuration of the ALU in FIG. 6.

A number of multiplication methods are known, and this invention incorporates a decoder based on the secondary Booth's method, which is shown herein. Other methods, however, can be used to implement this invention.

A multiplier and a multiplicand are referred to as X and Y, and described in terms of the complement of 2 as follows. For simplification, "m" is defined as an odd number.

$$X = \sum_{i=1}^{n} (Xi \times 2^{n-i}) - X0 \times 2^n \tag{1}$$

$$Y = \sum_{i=1}^{m} (Yi \times 2^{m-i}) - Y0 \times 2^m \tag{2}$$

If the result of multiplication is referred to as Z (=X×Y), Z can be expressed as follows using equations (1) and (2).

$$Z = \sum_{i=1}^{(m-1)/2} (Y2i+2 + Y2i+1 - 2 \times Y2i) \times X \times 2^{m-2i-1} \tag{3}$$

This indicates that a multiplication can be carried out by applying (m−1)/2+1 times of shift additions to the multiplier X.

The value of a partial product (Y2i+2+Y2i+1−2×Y2i) depends on the coefficients constituting the partial product, and is either "2" or "1" or "0" or "−1" or "−2". This relationship is shown in FIG. 25. However, Ym+1=0.

The equation (3) accumulates the multiplier X while equimultiplying or doubling it, or inverting its sign.

If the multiplier X is shown as "S○○○" in the case in which both "n" and "m" are "3", the bit diagram is as shown in FIGS. 26 and 27.

As shown in these figures, the process, which required additions of four partial products in normal multiplication, now requires only two accumulations. Each partial product has four bits of ○ so as to provide for a doubling operation. Doubling the multiplier X changes the least significant bit (LSB) to zero, resulting in "S○○○0".

Diagram 2 shown in FIG. 27 is an example of a method for avoiding the calculation of the sign bit S to reduce the number of steps in Diagram 1.

If each bit is calculated by the one bit ALU in the digital signal processor 1, the calculation of N bits and M bits requires only (N+3)×M/2 steps.

This calculation process is described in FIGS. 28 to 32 with reference to FIGS. 6 to 10. During this process, the cs selector in FIG. 10 always selects or saves the carry CY to cause a one clock delay. The selector in FIG. 6 to 10 uses the addresses of the multiplier X and the multiplicand Y which are present on the memory.

In this example, the multiplicand is Y0, Y1, Y2, and Y3, and the multiplier is X0, X1, X2, and X3. Y0 and X0 are sign bits. The result to be written is W0, W1, W2, W3, W4, W5, W6, and W7.

In the processing steps shown in FIGS. 28 to 32, sign "←" indicates that desired bit data is read out by controlling the read addresses of the memory RF is1 and is2. Sign "→" indicates that the output of the ALU is written to a pointed address.

Figure 28:
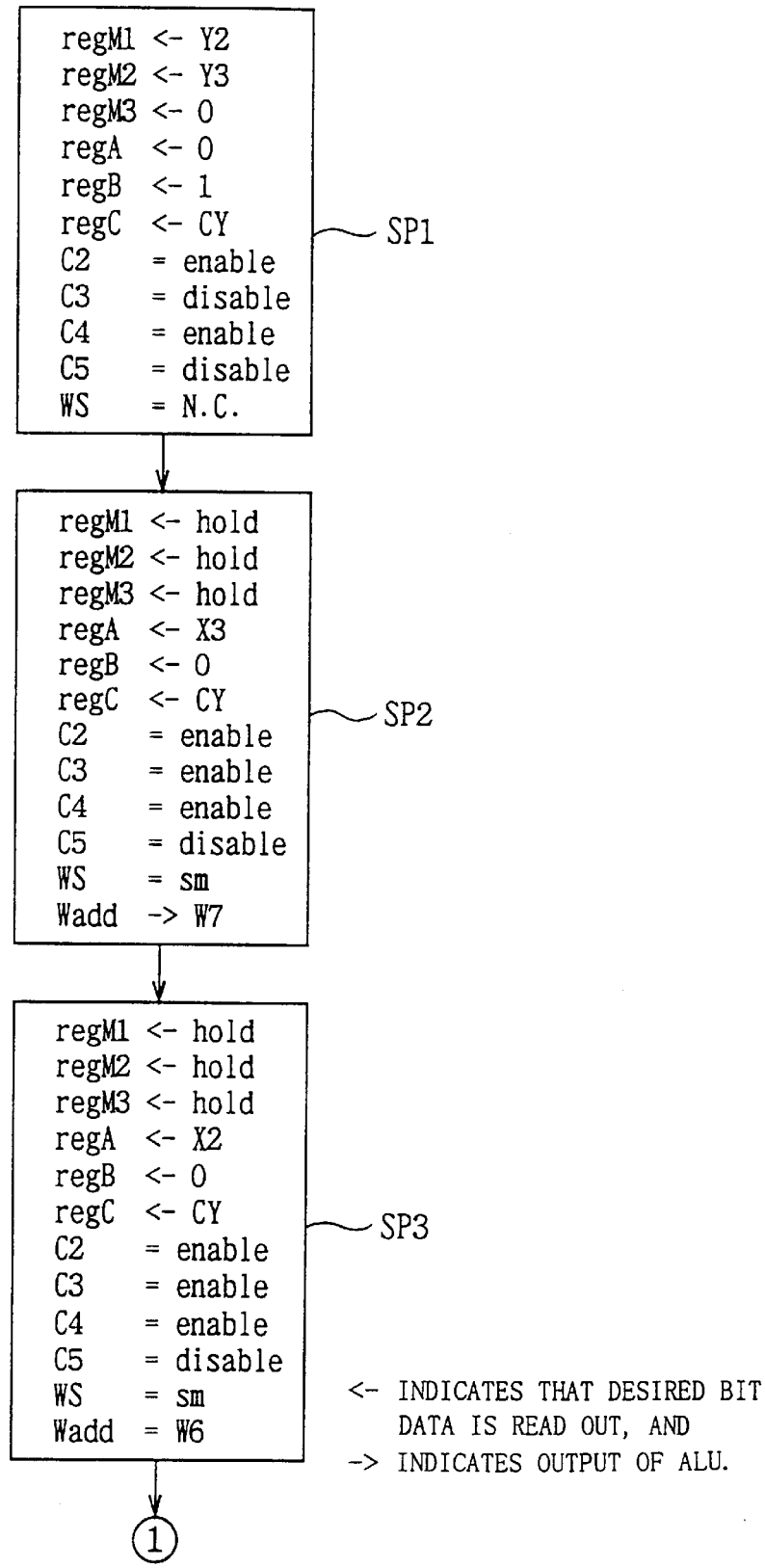
FIGS. 28 to 32 are flow charts showing a procedure for processing an arithmetic operation.
Figure 29:
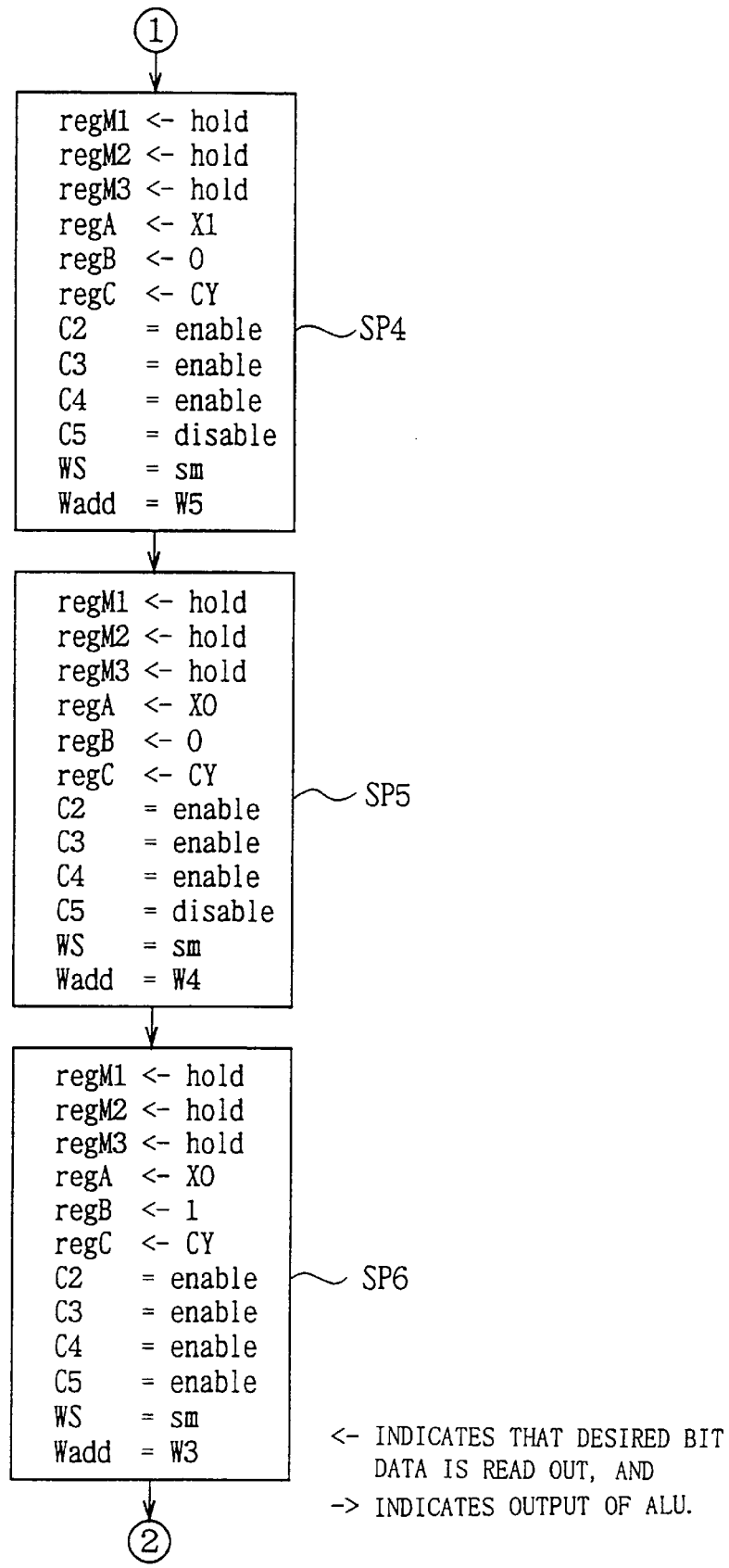
Figure 30:
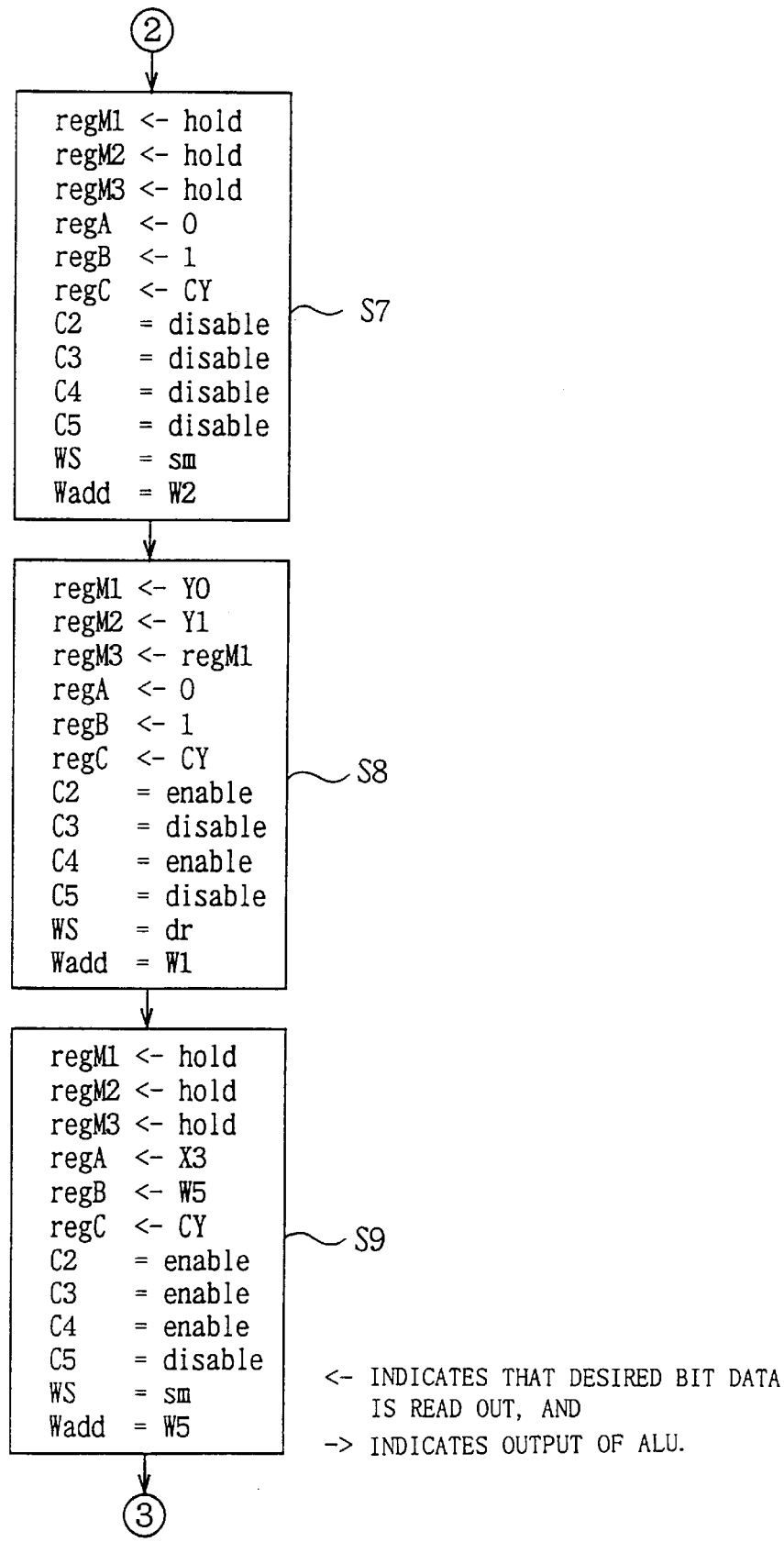
Figure 31:
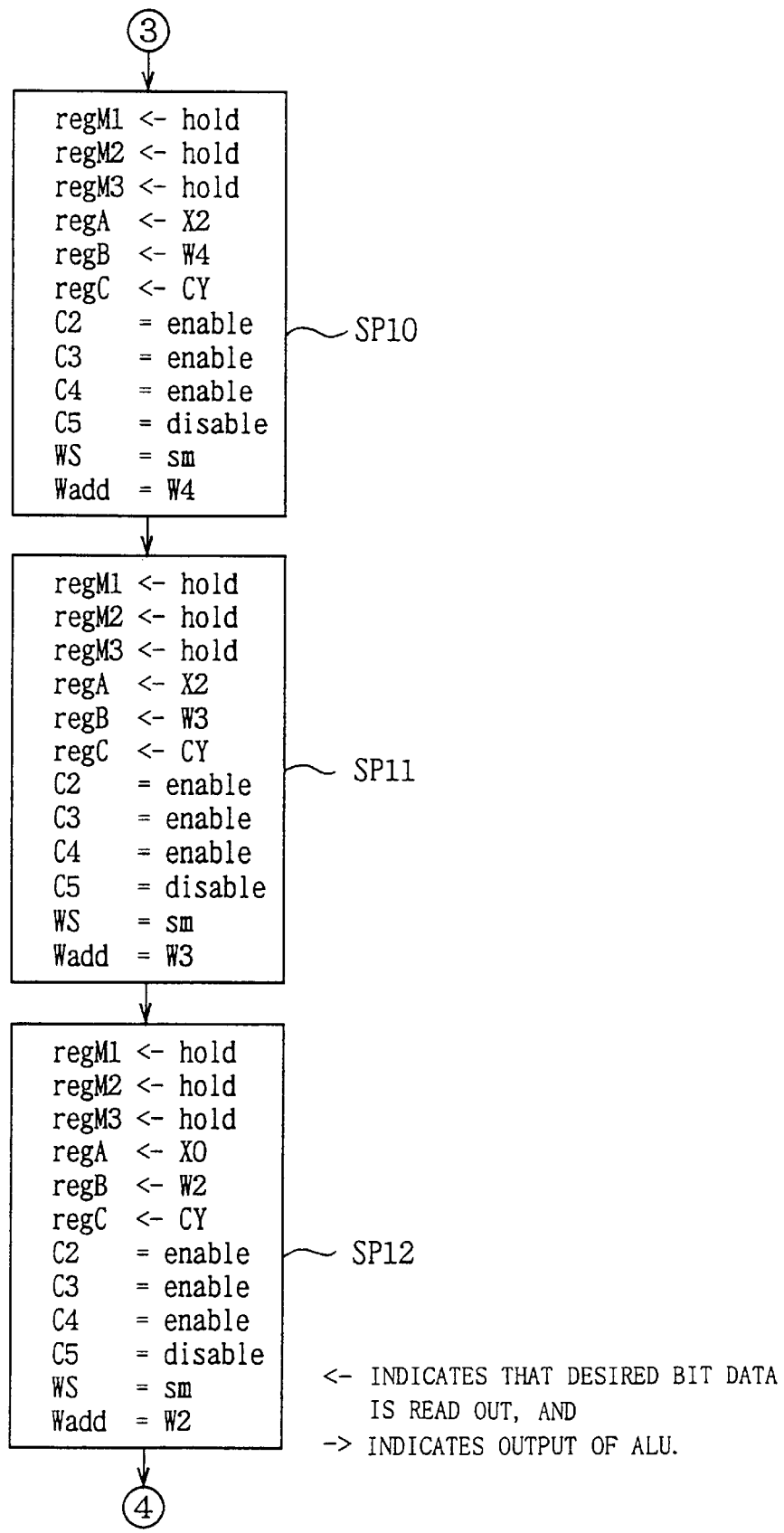
Figure 32:
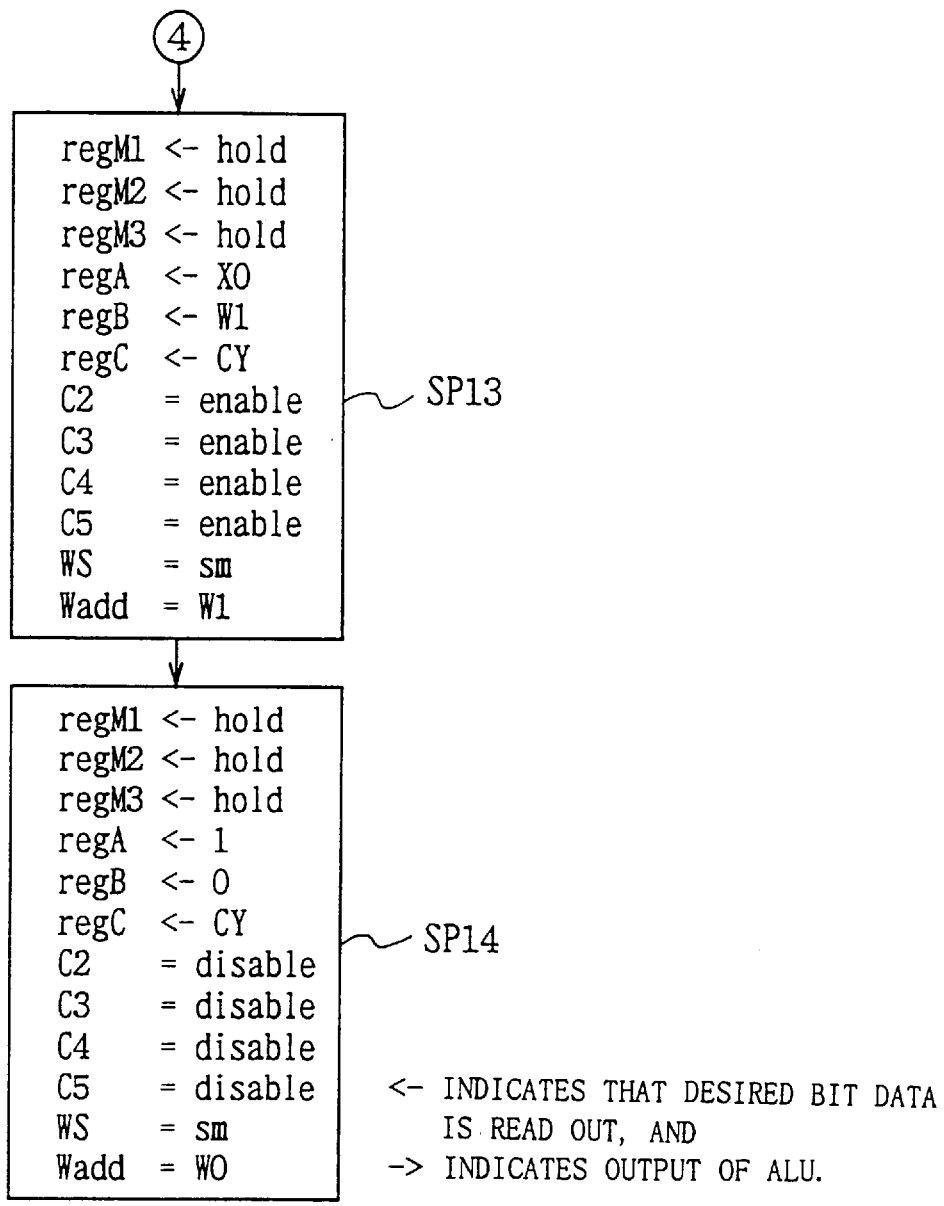

As shown in FIG. 28, the first step SP1 is executed. A multiplier is loaded in the register regMi (i=1, 2, and 3), and a coefficient to be multiplied into X is determined in the first step. The adr register loads "0", and when regM specifies a negative coefficient, "1" is input from regA to the full adder and "1" is set in regC.

In the subsequent step SP2, the least significant bit is processed according to the code for regM. If the output of regA is to be twice its input, the value of the adr register that was cleared in step SP1 becomes "0", and the output of regA is input to the full adder after a one clock delay, thereby achieving the doubling operation. If the output of regA is to be negative, regc has been set to "1" in step SP1, and a negative value obtained by xo1 inverting the input of regA is input to the full adder. If this values is "0", regC has been cleared to "0", ma1 inputs "0" to the full adder.

The process then proceeds through steps SP3, SP4, and SP5 to step SP6. In step SP6, X0 is read from regA as in step SP5 to provide for a doubling operation. In addition, regB receives "1", inverts the sign bit by enabling C5, and inputs the result to the full adder.

In the subsequent step SP7, the leading "1" of the first partial product is added. The carry CY from this operation is loaded in dr.

In step SP8, Y2 in regM1 is loaded in regM3, and a multiplier is set in regM. The carry CY loaded in dr in the preceding step is also written to this register.

The process then sequentially proceeds through steps SP9, SP10, SP11, and SP12.

The process passes to step SP13 to read X0 from regA as in step SP12 to provide for a doubling operation. C5 is also enabled to invert the sign bit of the value, which is then input to the full adder.

The calculation process passes to step SP14 to complete the 4 bit×4 bit operation.

If the number of the bits of the multiplier is larger, the operations from step SP8 to SP14 are repeated and the result is applied to the subsequent partial products. Except for the addition for the final partial product, the carry of the most significant bit (MSB) is stored in the dr register and written to the memory in the first step for reading out a multiplier for a calculation of the subsequent partial product. In this example, this is executed in steps SP7 and SP8.

If a multiplier can be supplied from the coefficient RAM, c16 and c18 are controlled by the coefcc field of the code RAM, and values from the coefficient memory are loaded in regM1 and regM2 when a multiplier is to be loaded as in steps SP1 and SP8 in the above example.

A multiplier is loaded in the coefficient RAM so that the addresses of the coefficient memory are controlled so as to output a multiplier two bits at a time from its least significant bit (LSB). This enables the value held in the coefficient RAM to be used as a multiplier for a multiplication.

For multiplication with constant coefficients, the code RAM may be directly programmed so as to control c16 and c18.

(2-4) Subroutine Processing

Next, methods for executing as subroutines calculations such as multiplication are described. For simplification, the explanation is limited to multiplication.

Preferably, fixed patterns such as multiplication are repeatedly used as subroutines to reduce the size of the code RAM.

Once the leading address has been specified, a desired address of a multiplicand or multiplier can be pointed simply by incrementing the address counter. To do this, the number of continuous addresses of the code RAM into which a coefficient can be written from its least significant bit (LSB) is limited.

Although a normal processor incorporates a general-purpose register for storing data and addresses specific to the use of a routine before passing control to a subroutine, this invention has only an address register for the leading address of operands because in those controllers in the digital signal processor according to this invention which execute only sequence control, the provision of such a general-purpose register results in an increase in the size of the circuit.

When reg2ctl in the code RAM is enabled, the address of the code RAM is loaded in the address register, and the codes C20 to C24 are also loaded in the corresponding register.

These registers indicate the addresses of the value to be read from the memory including the memories located to the right and left of the processor element. The values of these registers can be loaded in the address counter under the control of rlc3-0, r2c3-0, wc3-0, or rlctl, thereby enabling the addresses of operands to be passed to a subroutine for a multiplication.

A multiplication subroutine is described. It is assumed that a multiplicand stored in the memory is multiplied by a coefficient stored in the coefficient RAM. Before control is passed to the subroutine, the coefficient RAM sets the leading address in the coefficient RAM address counter, and the leading address (the address of the least significant bit) of the multiplicand is loaded in the address register reg2. At the beginning of the partial product calculation in the above multiplication process, that is, in steps SP1 and SP9, the address stored in reg2 is loaded in the address counter.

To calculate partial products, the address counter may be incremented. If the coefficient for the multiplication has been loaded in the memory and is to be used as a multiplier, its leading address is loaded in the address register reg2. In the above example, in steps SP1 and SP8, the multiplier is loaded from reg2.

In addition, to store a multiplier in reg2, its address must be incremented by two bits for each partial product. In any step in which an addition of a partial product is carried out, reg2 may be incremented twice.

The address register reg2 is a combination of the address register for each address and a register for storing the bits C20 to C24 for controlling the is1 and is2 of the ALU.

All the processor elements shown in this example are controlled by the same commands.

In some cases, however, different processing is required for each processor element. Methods for doing this are explained.

Such methods are based on SIMD processing that must perform common operations. The results of different processes are thus obtained by an operation for selecting from values obtained by the processors based on some criteria. This operation is performed by selecting between values read out from two different addresses based on the bit logic written to regM1.

First, selection criteria reflecting certain bit logic are loaded in regM1.

The CS selector in FIG. 10 selects a path for I2, and the ws selector selects the ds selector. This enables a value passing through I2 and the sum SM to be selectively written to the memory.

By setting regB and regc to "0", allowing regA to select the value of the I1 port, and disabling the processing of the output of regA which is executed by ads, xo1, ma1, and xo2, the value of I1 is obtained in the sum SM, so the value of I1 or I2 can be directly selected.

This selection operation enables divisions. Divisions are carried out as follows; A divisor is subtracted from a dividend. If the result is positive, "1" is placed in the relevant digit of the quotient, and the result of the subtraction is rewritten as a dividend. If the result is negative, "0" is placed in the relevant digit of the quotient, and the dividend is used in the next bit without changes. The division is then shifted one bit toward the least significant bit (LSB). A similar operation is repeated.

This enables additions, subtractions, multiplication, and divisions.

(2-5) Individual Processing by the Processor Elements under SIMD Processing

This section describes methods for allowing each processor element to execute different processing using the SIMD processing described above.

This requires a method for allowing each processor element to recognize its location or processing to carry out. All the processors each execute one of all the possible processes, and one of the above methods is then used to select among the results.

Methods for recognizing the location of a processor element relative to its block end are shown.

One method inputs from the input register IR data and location information as a tag and uses this tag and regM1 to select the data.

Another method uses arithmetic operations. It is assumed that each processor element reads data from the memory of adjacent processor elements, and that reads from outside the processor element at the block end result in "0".

When all the processor elements continuously read data from an adjacent processor element, add "1" to the data, and write the result to themselves, the processor element at the block end which constantly reads "0" continuously writes "1" to itself, and its adjacent processor element continuously adds "1" to the "1" from the preceding processor element, and writes "2" to itself. The processor elements can thus be numbered from one end of the block.

Based on these numbers, regM1 may select among processing results obtained from the processor elements.

The processor element according to this invention may read data from a second processor element located next but one to the first processor element, and adds "2" to this data. Alternatively, this operation is executed a number of times equal to half the number of the processor elements, and the value of an adjacent processor element is then added to the value of the RF memory of a first processor element to shift down toward the least significant bit (LSB). This method approximately reduces the number of operations to half.

A combination of the above basic operations enables various processor elements to carry out different processes.

(2-6) Processing Timing and Programming Methods for the DSP

Next, processing timing and programming methods for the digital signal processor 1 are described.

The digital signal processor is suitable for processing scan image signals, and can associate each processor element with a different pixel so that common instructions can be used to execute required processing.

Scanned pixels of an image are input in synchronism with a sync or blanking signal for the image (hereafter simply referred to as a "sync" signal).

When the sync signal becomes "H", the leading data of a line of images is provided to the input port of the digital signal processor. The signal remains "H" until this line of pixels have been finished. The signal then becomes "L", and after an interval of several tens of clocks or longer, the input of the line is started.

The basic operation is as follows.

At the beginning of each line, before image data is input, i1rst or i2rst is enabled to clear "sftreg". A pulse of "H" is provided to the input ports i1pti and i2pti in synchronism with i1sft and i2sft for the leading pixel of the line. Image data is input in synchronism with i1sft and i2sft. While the sync signal remains "L" after a pixel of the line has been input, the controller 3A in FIG. 1 reads out this pixel and stores it in the memory.

Figure 33:
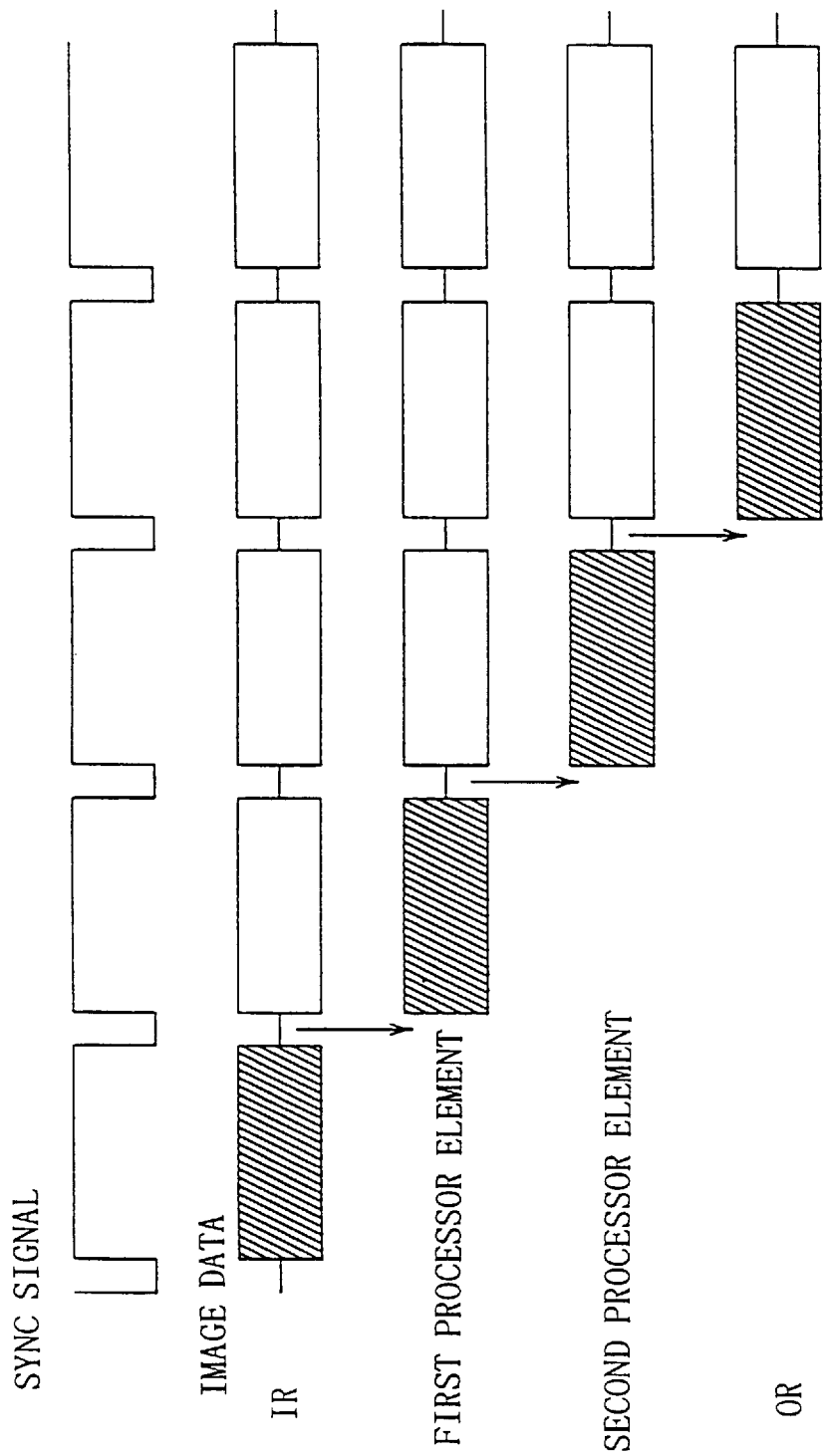
FIG. 33 is a schematic diagram showing a processing timing for image signals.

The group of processor elements controlled by the controller 3A apply required processing to this input pixel, and delivers the resultant data to the second group of processor elements controlled by the controller 3B. The second group of processors further process the data, which is then output from the output register OR. The timing for each line is as shown in FIG. 33.

In this example, the HD mode has been described, but in the SD mode, the output of the output register OR may again be input to the input register IR to double the number of process steps.

The memory can be used as a line memory so that several lines of pixels can be stored therein and used for required processing, thereby causing a line delay of several lines.

To carry out such processing, several lines of data stored in the memory must push old lines therein when new lines are input, but the address rotation function may be used to update the step value for each line in order to produce an effect similar to pushing in a program in which a new line is written to the same particular address.

Next, a general programming method for the digital signal processor according to this invention is shown in FIGS. 34 and 35.

Initialization is first executed, that is, processing required beforehand including the numbering of the processor elements and the loading of coefficients is carried out.

A program is then selected and processed, that is, the process uses the control codes to select one of the programs written to several code RAMs which can be used for required processing in order to jump to the address of the program.

The selected processing is then carried out, and the process repeats this processing or returns to the selection of a program.

The contents of the processing are as follows.

Reads are specific to the first processor element. In response to a wait instruction, the process waits for a sync signal of "L" for the input, and once this condition has been met, reads data from the input register IR.

Writes are specific to the second processor element. In response to a wait instruction, the process waits for a sync signal of "L" for the output, and once this condition has been met, writes data to the output register OR.

The first and second processor elements synchronize with each other by waiting for a "transopen" signal. If the controllers for both processor elements can synchronize with each other, the transopen signal is enabled, and the first processor element generates a write operation, while the second processor element generates addresses of the memory which can accommodate image data output by the first processor element, thereby initiating data transfer.

Desired processing is then carried out using the logical and arithmetic operations described above.

Although in the above description, the process waits for a sync signal of "L", various signals can be used as required to externally control the operation, as described in the "control circuit" section.

(2-7) Rate Conversion Processing (2-7-1) Rate Conversion in the Horizontal Direction A method for using the digital signal processor according to this invention to apply rate conversion to scan image signals is described.

By way of example, a method for tripling the rate is described with reference to FIGS. 36A to 36C. FIG. 36A numbers the processor elements; each processor element reads data from the processor element leftwardly adjacent thereto, uses its ALU to add "1" to the data, and writes the resultant value to its memory. This enables the memories to be sequentially numbered from one end.

FIG. 36B then divides an address by "3" to determine a remainder. The lower two bits of the remainder are ORed, and the result is written to modereg of the input register IR.

Thus, "0" can be written to only those locations in modereg in FIG. 2 which correspond to multiples of three, whereas "1" can be written to the other locations. Data sequentially input from the input port is assigned to the input registers IR for the processor elements in the locations corresponding to multiples of three, whereas no value is assigned to the input registers IR for the other processing elements. The latter is shown by the values D1, D2, and D3 in address8 in FIG. 37.

A method for introducing coefficients from the coefficient RAM is described with reference to FIG. 36C. For simplification, two taps are used for a filter coefficient so that original image data is selected in locations corresponding to multiples of three and that 1/3 and 2/3 or 2/3 and 1/3 is set in the other locations.

A selection operation is carried out using the ds selector in FIG. 10.

The least significant bit (LSB) of the above remainder is introduced into regM1. The ds selector selects for the sum SM only the processor elements with a remainder in address1 of "1".

Data from address2 is loaded in I2 and written back to address2. Then, 2/3 is read from the coefficient RAM, coefcc is set at "2" or "3", and this coefficient appears in the least significant bit (LSB). Each bit controls C11, and by controlling the ALU so that values read from the coefficient RAM are output from the sum SM, 2/3 is written to only the address2 of the processor element with a remainder of "1". Then, by reading 1/3 from the coefficient RAM and performing a similar operation on address3, 1/3 can be introduced into the address3 of the memories for the processor elements with a remainder of "1".

A coefficient can be similarly introduced into the processor elements with a remainder of "2".

Figure 37:
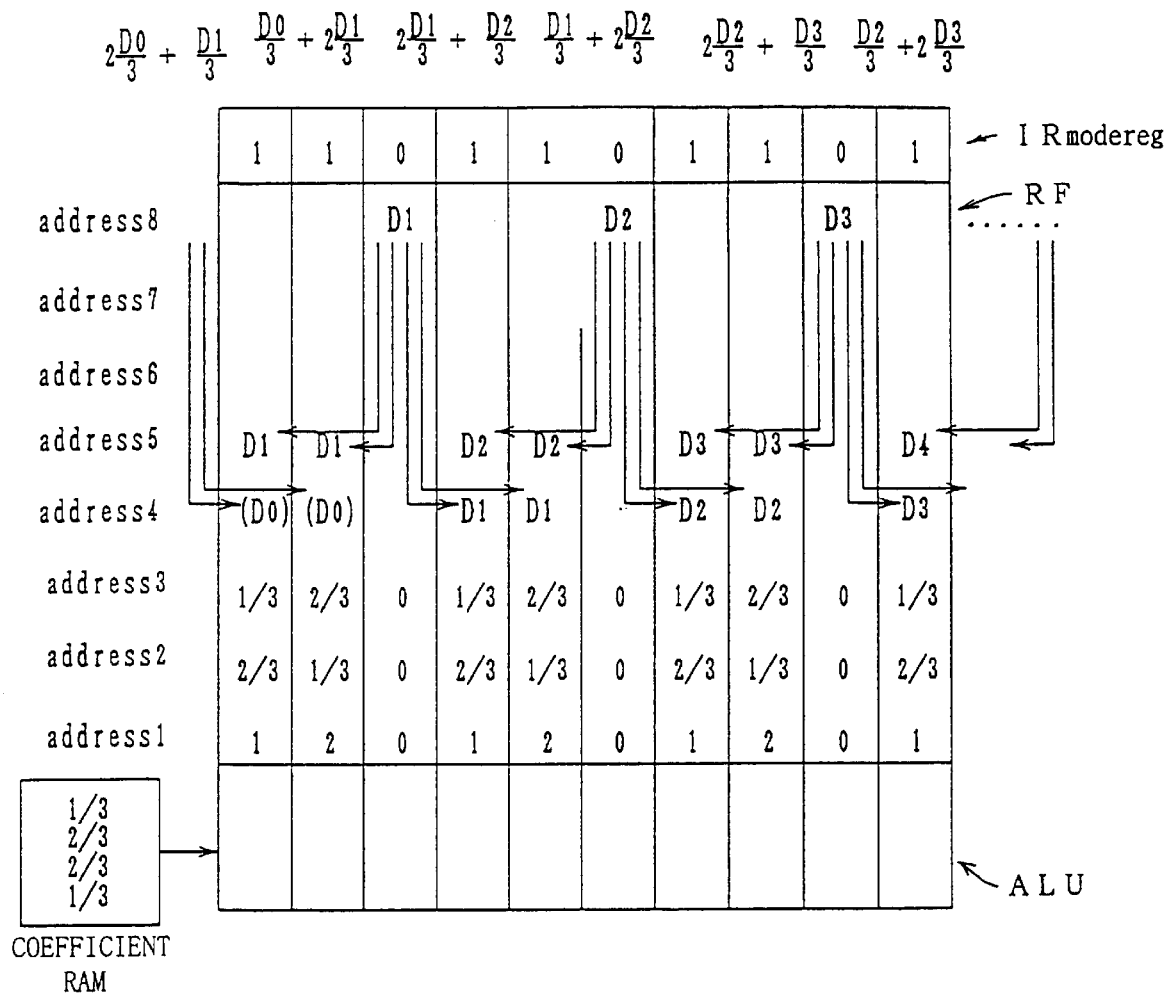

FIG. 37 describes processing for pixel data.

As briefly described with reference to FIG. 36B, sequentially input data is written to only those processor elements in which "0" has been written to modereg. Each ALU must load this value in the memory. It loads it in address8 in FIG. 37.

By reading the value of address8 from I1 while using the dr selector to perform selective operations as with the above coefficient, pixel data required for filter operations can be introduced into address4 and address5.

A processor element with a remainder of "1" obtains a pixel from the processor element leftwardly adjacent thereto, and another pixel from the processor element rightwardly adjacent but one thereto.

A processor element with a remainder of "2" obtains a pixel from the processor element leftwardly adjacent but one thereto, and another pixel from the processor element rightwardly adjacent thereto.

The pixel data in address4 is multiplied by the coefficient in address2, the pixel data in address5 is multiplied by the coefficient in address3, and the two products are added together. The result is placed in address6.

Finally, the lower two bits of the remainder are ORed, the result is input to regM1, and the values in address8 and address6 are selected. For processor elements with a remainder of "0", the input value of the input register IR is directly selected, while for processor elements with a remainder of "1" or "2", the operational result written to address6 is selected and output to the output register OR.

A triple rate conversion is thus executed on the pixels on the horizontal line.

In addition, the use of the modereg of the output register OR as well as the modereg of the input registers IRs enables various remainders to be derived. Then, by loading a coefficient required for each phase from the coefficient RAM according to these remainders and obtaining input pixels through communications between the processors, the number of pixels or the rate can be converted on the basis of general extension and reduction.

(2-7-2) Rate Conversion in the Vertical Direction

Next, a method for converting the rate in the vertical direction is shown.

An image is input in synchronism with its sync signal so that scanned image data is input to the input register IR one line at a time.

On the other hand, processed image data is output from the output register OR in synchronism with a different sync signal one line at a time.

Programming can be carried out very easily by providing a buffer in the input or output section of the digital signal processor using a means such as a frame memory in order to match the rates for I/Os.

This section shows a method for using only this digital signal processor instead of a buffer means such as a frame buffer. In this case, these two sync signals corresponding to inputs and outputs, respectively, do not match, but their phases are predetermined and the same states are periodically repeated according to their ratio.

By way of example, FIG. 38 shows the timing relationship. This shows the case in which a line is generated in the ratio 3:2. The signal processing circuit for processing real time signals according to this invention allows delays in terms of lines, but must continuously input and output pixels strictly in synchronism with the sync signal.

The first group of processor elements must read data from the input registers IR while the input to them is being blanked, while the second group of processor elements must write data to the output register OR while the output from them is being blanked. The phases of these two operations are periodic for each line but differ.

A plurality of programs are provided to meet the conditions on the phasic relationship between the sync signals, and must accommodate external switching.

Figure 39:
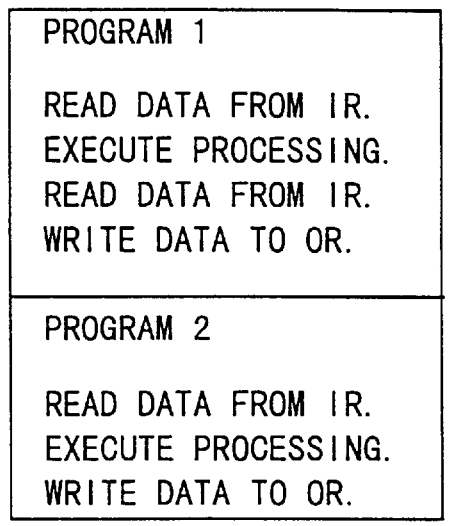
FIG. 39 is a table showing the contents of a program in the case where the processing of an image signal is finished in the period of time required to process a single line.

In FIG. 38, if the amount of image signals to be processed is such that the processing of these signals is finished within a period of time A corresponding to the period of time required to process a single line, the two programs shown in FIG. 39 may be synchronously and alternatively executed.

In this figure, IO indicates that data is being read from the input register IR or written to the output register OR. P indicates that processing is being carried out. W indicates that the process is waiting for a read from the input register IR or a write to the output register OR to finish.

Figure 40:
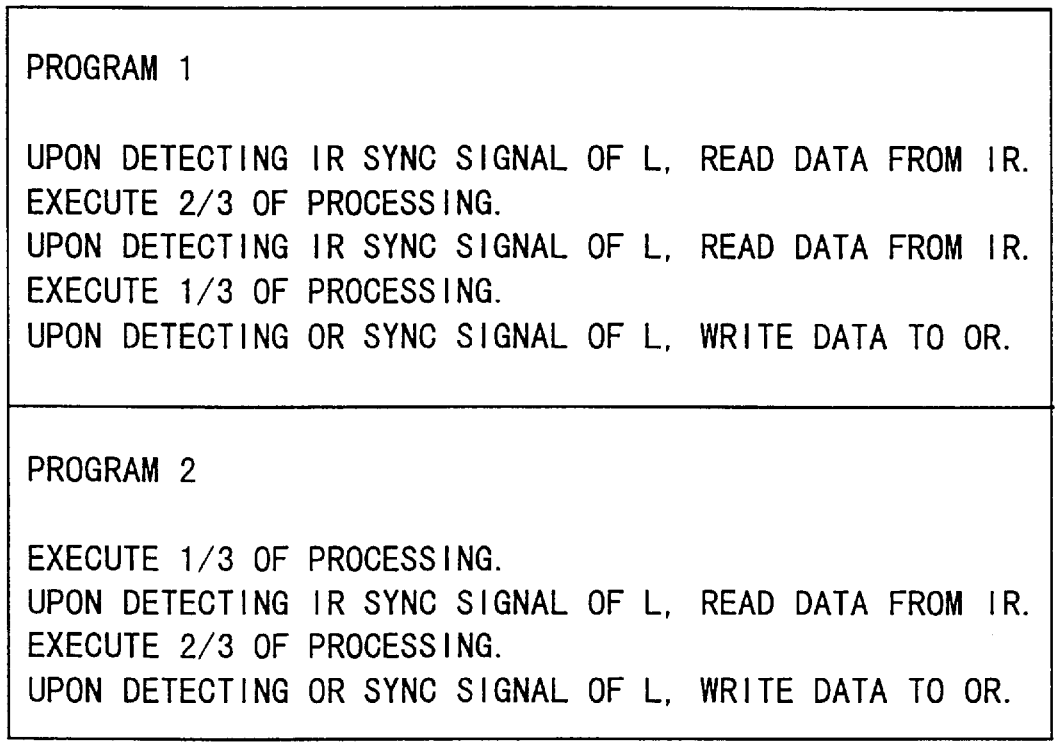
FIG. 40 is a table showing the contents of a program in the case in which the processing of an image signal is not finished in the period of time required to process a single line.

In this example, if the amount of signals to be processed need be equal to a period of time B, the two programs shown in FIG. 40 are executed. In this example, the two programs may be alternatively executed every other line using the control codes.

(2-7-13) General Rate Conversion

Finally, rate conversions in general ratios as shown in FIG. 41 are described. As in the above example, all the programs that execute inputs or outputs with required timing may be provided, and an appropriate program may be selected and executed in synchronism with the sync signals based on their phasic relationship.

In some cases, the number of programs may be enormous due to the I/O ratio. Since, however, this invention has a first and second processors and the timing with which data is delivered from the first processor to the second processor may be set independently of the I/O sync signals, the types of programs may be significantly reduced using this timing as a buffer, thereby enabling programming to be carried out easily and the size of the code RAM to be reduced.

The program for the first processor is flexibly created so that the timing with which data is transferred from the first processor to the second processor is shifted relative to the program for the second processor.

FIG. 42 shows one example. Two types of programs are selectively used as a program for the second processor. I, 0, W, and P in FIG. 42 mean data transfer from the first processor to the second processor as in FIG. 38.

To carry out a vertical rate conversion, several lines of pixels are stored in the memory, and filter operations are performed among the lines. The sample location may vary on an output line basis, and it is necessary to select a filter coefficient corresponding to the sample point.

Programming can be carried out easily by using the address rotation function and the rotation function of the address counter of the coefficient RAM. A rate conversion may be executed by programming a horizontal filter into the first processor element and programming a vertical filter into the second processor element.

(2-7-4) Power Saving Processing

Finally, methods for saving power are described.

FIG. 1 shows theoretical blocks, and each of the blocks shown in this figure is divided into several pieces when mounted on the chip. The bit line of the input register IR for inputs is divided so as to correspond to the blocks. A pointer input from one end of the input register IR and indicating processor elements to be written to travels through each physical block despite this block division, but no writes occur on those physical blocks on which this pointer is not present. Thus, the reset set flip flop detects the presence of this pointer, and the bit line is driven only when this pointer exists.

The reset set flip flop is set when the pointer is input to its physical block, and reset when the pointer is output. The output of the reset set flip flop enables the buffer of the bit line.

Some applications require all the functions of this circuit to be used. A reset signal enables the right block in FIG. 1 to be powered down. At this time, a control signal from the control circuit to the processor block selects a value for determining the value of the register node inside the processor block, thereby allowing a through current to flow in order to prevent excessive power from being consumed.

(3) Effects of the Embodiment

As described above, the digital signal processor according to this embodiment has an architecture in which a processor is placed on the bit lines of the memory and constitutes a processor element together with this memory on the bit lines, and in which a plurality of such processor elements are placed in parallel in such a way that the number of these processor elements corresponds to the number of pixels.

The SIMD method is used and a controller for controlling a plurality of processors is provided for each group of processor elements (each processor block) to uniformly control all the processor elements within the processor block.

Bit serial processing is carried out using only a full adder and peripheral circuits because the area of the processor element is substantially limited by the width of the memory.

A plurality of groups of processor elements are provided within a single chip, but the configuration of the block may be changed so as to correspond to both standard signals and high definition signals.

Two processor elements are provided for each pixel to increase arithmetic operation performance.

To facilitate the control of processing and to improve processing steps, the memory uses a two-read and one-write method and has three ports, and an address can be independently specified for each of these three ports.

A serial access memory is used for I/Os, and signals such as images are input thereto serially with respect to words and in parallel with respect to the bits within the word.

A processor element reads and processes one word, one bit at a time. For images, such reads are appropriately carried out during a blanking period.

Likewise, the results of processing is written to the serial access memory for outputs during a blanking period, and read out serially with respect to words and in parallel with respect to the bits in the word.

Two such input serial access memories can operate independently, and the output serial access memory can also operate independently.

For controlling, control codes for each section are horizontally written to a memory called a code RAM and operated by a simple sequencer.

Since in the real time processing of images, a single process must be carried out in several thousand steps and bit serial processing requires several steps for additions and several tens of steps for multiplication, this invention uses a horizontal program architecture to efficiently execute processing in all the steps.

Some programs common to the processor elements can be used as subroutines by incrementing only the address of the memory. This invention thus has a special circuit for this purpose. This minimizes the size of the code RAM to meet the requirement that all the elements are mounted on a single chip.

Such improvement of the circuits assures programmability while minimizing the area of each section.

Multiplication, which are frequently used in image processing and require a large number of steps, can be carried out in $(n+3) \times m/2$ steps (in a multiplication with n-bits and m-bits) by providing a special circuit within the processor element.

Such improvement enables the programming of the extension or reduction of images and rate conversions.

This invention can thus provide a digital signal processor that has sufficient programmability for various image signals and high arithmetic operation performance.

It can also provide a digital signal processor with low power consumption taken into consideration.

As described above, according to this invention, a group of processor elements is constituted by individual processor elements each configured by disposing an arithmetic and logic unit on the bit lines of a multiport memory wherein their number is equal to or larger than the number of the data bits in a series of serial data, and the plurality of processor elements constituting the group of processor elements are controlled by controllers mounted on the same silicon chip. Consequently, the multiport memory functioning as a buffer for input data and the arithmetic and logic unit are closely joined together, so data can be communicated smoothly between them. Since the plurality of processor elements are controlled by a single controller so as to operate as a parallel computer, a digital signal processor with a high processing speed can be implemented.

While there has been described in connection with the preferred embodiments of the invention, it will be obvious to those skilled in the art that various changes and modifications may be aimed, therefore to cover in the appended claims all such changes and modifications as fall within the true spirit and scope of the invention.

What is claimed is:

1. A digital signal processing apparatus comprising:

a group of processor elements, each processor element having a multiport memory that can simultaneously activate at least two read ports and one write port, and an arithmetic and logic unit located on a bit line of said multiport memory for cooperating with the multiport memory to process a series of serial data for each data, said group of processor elements including the processor elements having a number of data that is equal to or larger than a number of data of an input signal which is composed of a plurality of data for one cycles, wherein each of said processing elements further comprises at least:

a first selector for selecting either the multiport memory value of a processor element neighboring the processor element provided in a chip or the multiport memory value of the processor element in the chip:

a second selector for selecting data to be provided to said arithmetic and logic unit from the multiport memory value of said first selector;

a decoder operative according to Booth's algorithm:

pipelined registers for performing three-stage pipeline, the three stages including a stage for reading data from said multiport memory, a stage for processing data, and a stage for writing data to the memory: and a three bit register provided for said decoder; and a controller mounted on the same silicon chip on which said group of processor elements are mounted for uniformly controlling all of the processor elements in said group of processor elements.

2. The digital signal processing apparatus according to claim 1, wherein the apparatus comprises an input serial access memory and an output serial access memory in which the words in the data to be input are serially input and output and the bits in the word are input and output in parallel; said bits in the word correspond to the same address space as each bit in said multiport memory; a read bit line of input bits is connected to a write bit line of said multiport memory of said processor element via a buffer so as to directly transfer the data; and the bits output from processor element can be written.

3. The digital signal processing apparatus according to claim 2, wherein when said series of serial data is an image signal, the apparatus pipelines an operation for writing one line of pixels to said input serial access memory, an operation for using said group of processor elements to process said one line of pixels, and an operation for reading said one line of pixels from said output serial access memory.

4. The digital signal processing apparatus according to claim 2, wherein said input and output access memories and said group of processor elements can each operate according to independent clocks.

5. The digital signal processing apparatus according to claim 2, wherein the number of bits per said processor element in said input serial access memory is set to be twice the number of bits per said processor element in said output serial access memory.

6. The digital signal processing apparatus according to claim 5, wherein the number of bits per said processor element in said input serial access memory is 64 bits, while the number of bits per said processor element in said output serial access memory is 32 bits.

7. The digital signal processing apparatus according to claim 2, wherein the apparatus incorporates two groups of said processor elements for processing one line of pixels in an image signal input as said series of serial data, and in that a selector can switch the connection between the input serial access memory and the output serial access memory of said two groups of processor elements so that the output of one group of processor elements is input to another group of processor elements.

8. The digital signal processing apparatus according to claim 7, wherein:

each of processor elements is linearly arranged such that data can be interchanged with the neighboring processor element; and the processor elements located at the ends of said groups of processor elements can be connected together like processor elements in each group of processor elements via a selector so that said groups of processor elements can be used as a single block by using said selector to switch the connection.

9. The digital signal processing apparatus according to claim 7, wherein the processor elements located at the ends of said two groups of processor elements can be connected together like processor elements in each group of processor elements, and when a signal output from the output serial access memory in one of said groups of processor elements is used after being input to the input serial access memory in the other group of processor elements, the processor elements located at the ends of the groups of processor elements is disconnected.

10. The digital signal processing apparatus according to claim 7, wherein said processor elements in a first of said groups of processor elements are numbered, in that for each processor element, a different required calculation coefficient is read from a coefficient memory in a controller to said multiport memory according to the numbers, and in that a filter calculation is executed on input data using the calculation coefficient in order to carry out a rate conversion through a horizontal extension or reduction, with the results passed to a second group of processor elements.

11. The digital signal processing apparatus according to claim 10, wherein in said second group of processor elements, the number of required lines is stored in said multiport memory and a different coefficient is read from said coefficient memory for each line, in that a filter calculation is executed between stored lines to carry out a rate conversion through a vertical extension or reduction, and in that a rate conversion is executed through a vertical or horizontal extension or reduction by switching between the vertical filter calculation and outputting to said output serial access memory depending on an external output request.

12. The digital signal processing apparatus according to claim 2, wherein each pixel corresponds to a plurality of said processor elements in such a way that at least one of the plurality of processor elements can read data from the input serial access memory and that at least one of the plurality of processor elements can write data to the output serial access memory.

13. The digital signal processing apparatus according to claim 12, wherein the output of said arithmetic and logic unit in said processor element is connected to be able to drive the write line of the multiport memory for another processor element.

14. The digital signal processing apparatus according to claim 13, wherein said controller for controlling said processor element and another processor element operates them by synchronizing an output timing for an output value output from said arithmetic and logic unit and an address of the multiport memory of the processor element to be written to.

15. The digital signal processing apparatus according to claim 14, wherein said apparatus has two independent controllers for controlling said two groups of processor elements, and a one bit register is provided between the controllers to control the stop condition for each of said controllers.

16. The digital signal processing apparatus according to claim 15, wherein said registers maintain logic for stopping each of said controllers wherein the stop condition is cleared when said two controllers start to wait for the clearance of the stoppage of the output of values from the register.

17. The digital signal processing apparatus according to claim 2, wherein two processor blocks each comprising two vertically connected groups of 1,080 processor elements are mounted on the same chip so that the connection between the two processor blocks can be switched by the selector.

18. The digital signal processing apparatus according to claim 17, wherein the processor elements located at the ends of said two processor blocks can be connected together like processor elements in each processor block so that said two processor blocks can be used as a single processor block by using said selector to switch the connection, and in that image signals for up to 2,160 pixels can be processed per line.

19. The digital signal processing apparatus according to claim 17, wherein the processor elements located at the ends of said two processor blocks can be connected together like processor elements in each processor block, a signal output from the output serial access memory in one of said two processor blocks can be input to the input serial access memory in the other processor block, the processor elements located at the ends of processor blocks are disconnected, and image signals for up to 1,080 pixels can be processed per line using the two vertically connected groups of processor elements.

20. The digital signal processing apparatus according to claim 17, wherein four controllers that can operate independently are provided on the same chip so that the two processor blocks and the two groups of processor elements which are cascade-connected within the processor block can be controlled independently.

21. The digital signal processing apparatus according to claim 20, wherein each of said controllers has a code RAM and a sequencer so as to drive from the address of an arbitrary code RAM by the external signal.

22. The digital signal processing apparatus according to claim 21, wherein said code RAM is provided with an independent field for controlling each section of said processor block, and in that the addresses of said arithmetic and logic unit and said multiport memory can be controlled by said sequencer sequentially specifying the corresponding addresses in the code RAM.

23. The digital signal processing apparatus according to claim 22, wherein each of said controllers has an address counter for generating an address of said multiport memory and a repeat counter for regulating the number of times the address of the code RAM is repeatedly generated by said sequencer, wherein said sequencer repeats generating the same address the number of times written into the repeat counter.

24. The digital signal processing apparatus according to claim 23, wherein each of said controllers uses the control field for said address counter which is provided in said code RAM in order to control said address counter in such a way that an address is repeatedly read from said code RAM to said address counter, or that:

an address is repeatedly read from said code RAM to said address counter, while the address is incremented, or that:

the address held in said address counter during the preceding step is retained, or that:

the address held in said address counter during the preceding step is incremented.

25. The digital signal processing apparatus according to claim 23, wherein each of said controllers has an address register for storing address, and for said address counter selectively executes according to control from said code RAM, loading from said code RAM, loading from an address register in said code RAM for storing addresses, retention of a value from the preceding cycle, incrementation of a value from the preceding cycle, or retention or incrementation of the value while control from said code RAM is being repeated.

26. The digital signal processing apparatus according to claim 23, wherein each of said controllers has:

two registers for retaining the upper and the lower limits of a specific range of said memory addresses that said address counter generates;

a register for retaining the number of the divisions of the specific range when the range is divided;

a register for retaining the address widths of said divisions; and a register for retaining values to be added to said addresses.

27. The digital signal processing apparatus according to claim 26, wherein upon receiving an external initialization request, each of said controllers sets to zero said register for retaining values to be added, then based on external control, adds the value of said register indicating the address width of each division to said register for retaining values to be added, and subsequently clears to zero said register for retaining values to be added after additions have been carried out the number of times held in said register for retaining the number of divisions, and in that:

said controller compares the value of said two registers for retaining the upper and the lower limits of the specific range with the value of said address counter, and when the value of said address counter is included within this range, adds the value of said register for retaining values to be added to the value of the address counter, while subtracting the address width of said specific range from the value of said register for retaining the upper limit of said specific range and providing the result to said processor element as its memory address when the value to be added exceeds the value of said register for retaining the upper limit.

28. The digital signal processing apparatus according to claim 22, wherein each of said controllers has an address register for storing an address of said multiport memory and a stack register, and controls said sequencer based on a subroutine, return, or jump instruction provided by the control field for said address register which is provided in said code RAM.

29. The digital signal processing apparatus according to claim 23, wherein each of said controllers stores in said address register a memory address provided as an argument used in moving control to each of said instructions, and in that:

for the subroutine instruction, said controller stores in said stack register the address next to the current address of the code RAM, then uses the subroutine or jump instruction to move processing to an arbitrary address in order to execute processing in the routine of this jump destination address based on the memory address stored in said address register, and subsequently returns processing to an address of the code RAM which is specified by said stack register, based on a return instruction.

30. The digital signal processing apparatus according to claim 28, wherein each of said controllers executes loading and incrementation of an address from said code RAM or retention of a value according to the specification in the control field for the address register which is provided in said code RAM.

31. The digital signal processing apparatus according to claim 22, wherein each of said controllers has an address memory for storing an address to be jumped to so that control can be passed to a destination address provided by specifying an address from said code RAM which is to be stored in the address memory.

32. The digital signal processing apparatus according to claim 31, wherein an address in said address memory can be directly specified from outside the chip so that an executable program can be selected depending on the external status.

33. The digital signal processing apparatus according to claim 22, wherein each of said controllers has a function for stopping processing until a signal synchronized with externally input data reaches predetermined logic in order to process input data in real time.

34. The digital signal processing apparatus according to claim 22, wherein an address in said code RAM can be mandatorily supplied from outside the chip to said sequencer.

35. The digital signal processing apparatus according to claim 22, wherein each of said controllers incorporates a memory for storing coefficients, in that said processor element incorporates a register for retaining multipliers and a decoder that operates according to Booth's algorithm, and in that when a multiplication is carried out with a fixed coefficient, the coefficient is retained in the memory and bits equivalent to the Booth's degree are read at a time and loaded in the register for said decoder in order to carry out the multiplication in a reduced number of steps according to Booth's algorithm and to also introduce the multiplier into said processor element in a reduced number of steps.

36. The digital signal processing apparatus according to claim 35, wherein said apparatus has a selector for controlling a value to be input to said arithmetic and logic unit according to a value output from said memory for storing coefficients, and in that a value read from the memory for storing coefficients is used for a calculation.

37. The digital signal processing apparatus according to claim 35, wherein said coefficient can be input to the memory of said processor element.

38. The digital signal processing apparatus according to claim 35, wherein said apparatus has a counter that generates an address of said memory for storing coefficients and which can execute retention or incrementation of a value, or loading from the code RAM depending on an instruction from said code RAM.

39. The digital signal processing apparatus according to claim 38, wherein incrementation or retention of a value in a counter generating an address of memory for storing coefficients can be specified by the instruction from said code RAM while said sequencer is in a repeat state.

40. The digital signal processing apparatus according to claim 39, wherein when loading higher bits of the code RAM, said counter for generating an address of said memory for storing coefficients loads them only to higher bits and sets lower bits to zero.

41. The digital signal processing apparatus according to claim 39, wherein each of said controllers has:

two registers for retaining the upper and the lower limits of a specific range of addresses of said memory for storing coefficients;

a register for retaining the number of the divisions of the specific range when the range is divided;

a register for retaining the address widths of said divisions; and a register for retaining values to be added to said addresses.

42. The digital signal processing apparatus according to claim 41, wherein upon receiving an external initialization request, each of said controllers sets to zero said register for retaining values to be added, then based on external control, adds the value of said register indicating the address width of each division to said register for retaining values to be added, and subsequently clears to zero said register for retaining values to be added after additions have been carried out the number of times held in said register for retaining the number of divisions, and in that:

said controller compares an address output from the address counter for said memory for retaining coefficients to the values of said two registers for retaining the upper and lower limits of the specific range, and when the value of said address counter is included within this range, adds the value of said register for retaining values to be added to the value of said address counter, while subtracting the address width of said specific range from the value of said register for retaining the upper limit of said specific range and providing the result to said processor element as its memory address when the value to be added exceeds the value of said register for retaining the upper limit.

43. The digital signal processing apparatus according to claim 42, wherein when writing to the chip information for said code RAM, information for said jump destination storage memory, information for said coefficient memory, or information for said address conversion, a selection can be made between a method for externally and individually specifying a memory to which data is to be written and a method for writing data to all the memories in a predetermined order.

44. The digital signal processing apparatus according to claim 22, wherein at the beginning of external control, the count value of said address counter is cleared to zero to start an incrementation operation while a value that has been read from said multiport memory to said arithmetic and logic unit is simultaneously output from said arithmetic and logic unit without changes and rewritten to the same address, thereby preventing data retained in the memory of said processor element from being lost while the control register and memory are being rewritten even if said multiport memory of said processor element uses dynamic cells.

45. The digital signal processing apparatus according to claim 22, wherein when a reset signal is externally input, a control signal for determining the value of the register for said processor element is provided to said processor element, thereby determining the value of the internal node to prevent through currents in order to reduce power, and in that an independent reset signal is provided for each portion of the apparatus to reset unwanted portions for each application in order to reduce power.

46. The digital signal processing apparatus according to claim 22, wherein said processor elements can each read the value of said multiport memory read by a nearby processor element, and in that when a plurality of the processor elements are collected to form a group of processor elements, the processor elements located at the ends of the group of processor elements are adapted to read zero.

47. The digital signal processing apparatus according to claim 46, wherein for all the processor elements in said group of processor elements, when a value is read from a specific address of an adjacent processor element and used for an arithmetic or a logical operation, the result of the operation is repeatedly written to the same specific address so that the result representing a location relative to the end of said group of processor elements can be loaded in said multiport memory.

48. The digital signal processing apparatus according to claim 2, wherein:

said input serial access memory has memory cells, a data write bit line, a read bit line, a read address line, and a group of registers for retaining pointers for serial access write operations;

during a write, when a data input is started, said input serial access memory inputs to said register for retaining pointers, a pointer from one end of each of the processor elements placed in parallel within said group of processor elements; and said input serial access memory transfers the pointer in synchronism with sequentially input data and sequentially drives said write bit line according to sequentially input data, thereby allowing the memory cells for processor elements with the pointer present therein to retain the driven data.

49. The digital signal processing apparatus according to claim 48, wherein said processor block including a plurality of processor elements is mounted on the chip as a number of subblocks, with said pointer transmitted and received among the subblocks.

50. The digital signal processing apparatus according to claim 49, wherein a set reset flip flop is provided in said processor blocks, the set reset flip flop is set by said pointer to be input to said processor blocks and is reset when said pointer is output from one subblock of processor block to the other processor subblock, and in that said write bit line is driven only when the set reset flip flop remains set.

51. The digital signal processing apparatus according to claim 48, wherein said apparatus has two input serial access memories that can operate independently.

52. The digital signal processing apparatus according to claim 2, wherein a clock transferred from said output serial access memory to said input serial access memory is separate from clocks for other processor elements and input and output serial access memories, and in that the transfer circuit is operated at a speed several times as high as that of other clocks.

53. The digital signal processing apparatus according to claim 2, wherein said arithmetic and logic unit can read data from said input serial access memory and write data to said output serial access memory.

54. The digital signal processing apparatus according to claim 1, wherein:

said processor element has a memory, a one-bit full adder, a decoder operative according to Booth's algorithm, a register for storing multipliers, a group of selectors used to select input data, and a register for storing carries; and when setting said multiplier from the multiport memory for an accumulation, said processor element temporarily stores in said register for storing carries, a carry for the most significant bit in an operation for a partial product, and writes it to said multiport memory when a multiplier is read before a subsequent partial product operation, thereby carrying out a multiplication of m-bits×n-bits in terms of complements of two using $(n+3) \times m/2$ times of bit operations.

55. The digital signal processing apparatus according to claim 54, wherein said processor element sets said multiplier by obtaining one from the coefficient memory for said controller.

56. The digital signal processing apparatus according to claim 54, wherein said processor element sets said multiplier by obtaining one from the code RAM for said controller.

57. An information processing system comprising:

an input apparatus for inputting information;

a digital signal processing apparatus for receiving said information from said input apparatus, said digital signal processing apparatus having a group of processor elements, each processor element having a multiport memory that can simultaneously operate at least two read ports and one write port, and an arithmetic and logic unit that cooperates with said multiport memory to process a series of serial data bits one at a time wherein the number of processor elements is equal to or larger than the number of serial data bits, wherein each of said processing elements further comprises at least:

a first selector for selecting either the multiport memory value of a processor element neighboring the processor element provided in a chip or the multiport memory value of the processor element in the chip;

a second selector for selecting data to be provided to said arithmetic and logic unit from the multiport memory value of said first selector;

a decoder operative according to Booth's algorithm;

pipelined registers for performing three-stage pipeline, the three stages including a stage for reading data from said multiport memory, a stage for processing data, and a stage for writing data to the memory; and a three bit register provided for said decoder; and a controller mounted on the same silicon chip on which said group of processor elements are mounted for uniformly controlling all of the processor elements;

an auxiliary storage apparatus connected to said digital signal processing apparatus;

an output apparatus for outputting a processing result of said digital signal processing apparatus.

* * * * *

UNITED STATES PATENT AND TRADEMARK OFFICE
CERTIFICATE OF CORRECTION

PATENT NO. : 5,864,706
DATED : January 26, 1999
INVENTOR(S) : Masuyoshi KUROKAWA, Seiichiro IWASE, Takao YAMAZAKI and Kenichiro NAKAMURA It is certified that error appears in the above-identified patent and that said Letters Patent is hereby corrected as shown below:

Claim 1 should read:

-- 1. A digital signal processing apparatus comprising: a group of processor elements, each processor element having a multiport memory that can simultaneously activate at least two read ports and one write port, and an arithmetic and logic unit located on a bit line of said multiport memory for cooperating with the multiport memory to process a series of serial data for each data, said group of processor elements including the

UNITED STATES PATENT AND TRADEMARK OFFICE
CERTIFICATE OF CORRECTION

PATENT NO. : 5,864,706
DATED : January 26, 1999
INVENTOR(S) : Masuyoshi KUROKAWA, Seiichiro IWASE, Takao YAMAZAKI and Kenichiro NAKAMURA It is certified that error appears in the above-identified patent and that said Letters Patent is hereby corrected as shown below:

processor elements having a number of data that is equal to or larger than a number of data of an input signal which is composed of a plurality of data for one cycle, wherein each of said processing elements further comprises at least:

a first selector for selecting either the multiport memory value of a processor element neighboring the processor element provided in a chip or the multiport memory value of the processor element in the chip:

a second selector for selecting data to be provided to said arithmetic and logic unit from the multiport memory value of said first selector;

a decoder operative according to Booth's algorithm:

pipelined registers for performing three-stage pipeline, the three stages including a stage for reading data from said multiport memory, a stage for processing data, and a stage for writing data to the memory; and

UNITED STATES PATENT AND TRADEMARK OFFICE
CERTIFICATE OF CORRECTION

PATENT NO. : 5,864,706
DATED : January 26, 1999
INVENTOR(S) : Masuyoshi KUROKAWA, Seiichiro IWASE, Takao YAMAZAKI and Kenichiro NAKAMURA It is certified that error appears in the above-identified patent and that said Letters Patent is hereby corrected as shown below:

```
     a three bit register provided for said decoder; and a controller mounted on the same silicon chip on which said group of processor elements are mounted for uniformly controlling all of the processor elements in said group of processor elements. --
```

Signed and Sealed this

Tenth Day of August, 1999

Attest:

Attesting Officer

Q. TODD DICKINSON

Acting Commissioner of Patents and Trademarks